(12) United States Patent
Peng et al.

(10) Patent No.: US 12,200,795 B2
(45) Date of Patent: Jan. 14, 2025

(54) FAILURE PROCESSING METHOD, HANDOVER METHOD, TERMINAL DEVICE, AND NETWORK DEVICE

(71) Applicant: HUAWEI TECHNOLOGIES CO., LTD., Guangdong (CN)

(72) Inventors: Wenjie Peng, Shanghai (CN); Yi Guo, Shenzhen (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/942,937

(22) Filed: Sep. 12, 2022

(65) Prior Publication Data

US 2023/0007548 A1 Jan. 5, 2023

Related U.S. Application Data

(63) Continuation of application No. 16/573,465, filed on Sep. 17, 2019, now Pat. No. 11,477,709, which is a (Continued)

(30) Foreign Application Priority Data

May 5, 2017 (CN) .......................... 201710314196.5

(51) Int. Cl.
*H04W 36/00* (2009.01)
*H04W 36/24* (2009.01)
*H04W 76/18* (2018.01)

(52) U.S. Cl.
CPC ....... *H04W 76/18* (2018.02); *H04W 36/0016* (2013.01); *H04W 36/0033* (2013.01); *H04W 36/0069* (2018.08); *H04W 36/249* (2023.05)

(58) Field of Classification Search
CPC ......... H04W 36/0069; H04W 36/0016; H04W 36/0033; H04W 76/18; H04W 76/15;
(Continued)

(56) References Cited

U.S. PATENT DOCUMENTS 10,277,453 B2 * 4/2019 Wu ....................... H04W 76/19
10,887,812 B2 * 1/2021 Nigam .............. H04W 36/0079
(Continued)

FOREIGN PATENT DOCUMENTS

| CN | 101945452 A | 1/2011 |
| CN | 104378793 | 2/2015 |

(Continued)

OTHER PUBLICATIONS

Extended European Search Report in European Appln No. 23155569.9, dated Jun. 20, 2023, 11 pages.
(Continued)

*Primary Examiner* — Luat Phung
(74) *Attorney, Agent, or Firm* — Fish & Richardson P.C.

(57) ABSTRACT

This application provides failure processing methods, handover methods, terminal devices, and network devices. One method includes receiving a radio resource control (RRC) configuration of a secondary network device, if the RRC configuration of the secondary network device is from the secondary network device and the RRC configuration fails, sending, to a primary network device, first indication information for indicating a configuration failure of the RRC configuration.

18 Claims, 9 Drawing Sheets

Related U.S. Application Data continuation of application No. PCT/CN2018/085710, filed on May 4, 2018.

(58) Field of Classification Search
CPC ............ H04W 36/0079; H04W 92/20; H04W 36/0072; H04W 76/19; H04W 88/06; H04W 36/00

See application file for complete search history.

(56) References Cited

U.S. PATENT DOCUMENTS

| | | | |
|---|---|---|---|
| 11,089,648 B2* | 8/2021 | Mitsui | H04L 41/0668 |
| 11,184,818 B2* | 11/2021 | Uchino | H04W 36/36 |
| 2014/0004863 A1 | 1/2014 | Zhang | |
| 2015/0201418 A1 | 7/2015 | Zhang et al. | |
| 2015/0365984 A1 | 12/2015 | Lee et al. | |
| 2016/0183321 A1* | 6/2016 | Wen | H04W 76/18 |
| | | | 370/329 |
| 2016/0192245 A1 | 6/2016 | He et al. | |
| 2018/0049213 A1 | 2/2018 | Gholmieh | |
| 2018/0049214 A1 | 2/2018 | Kubota | |
| 2018/0302827 A1* | 10/2018 | Mitsui | H04W 76/15 |
| 2019/0215886 A1 | 7/2019 | Lee | |
| 2019/0246286 A1 | 8/2019 | Henttonen | |

FOREIGN PATENT DOCUMENTS

| | | | |
|---|---|---|---|
| CN | 104378793 A | | 2/2015 |
| CN | 105992292 A | | 10/2016 |
| CN | 107666727 | | 2/2018 |
| EP | 2983445 | | 2/2016 |
| EP | 3142452 | | 3/2017 |
| EP | 3496448 | A1 | 6/2019 |
| JP | 2016225998 | | 12/2016 |
| RU | 2576019 | | 2/2016 |
| WO | 2014047878 | | 4/2014 |
| WO | 2014163143 | | 10/2014 |
| WO | 2014182229 | A1 | 11/2014 |
| WO | 2015115959 | | 8/2015 |
| WO | 2015171053 | | 11/2015 |
| WO | 2017029796 | | 2/2017 |

OTHER PUBLICATIONS

Office Action in Chinese Appln. No. 201710314196.5, dated Feb. 16, 2023, 18 pages.
3GPP TS 36.331 V14.2.2, "3rd Generation Partnership Project; Technical Specification Group Radio Access Network; Evolved Universal Terrestrial Radio Access (E-UTRA); Radio Resource Control (RRC); Protocol specification (Release 14)," Apr. 2017, 347 pages.
3GPP TS 36.423 V14.2.0, 3rd Generation Partnership Project; Technical Specification Group Radio Access Network; Evolved Universal Terrestrial Radio Access Network (E-Utran); X2 application protocol (X2AP) (Release 14), Mar. 2017, 242 pages.
3GPP TS 37.340 V0.1.0, "3rd Generation Partnership Project; Technical Specification Group Radio Access Network; Evolved Universal Terrestrial Radio Access (E-UTRA) and NR; Multi-connectivity, Stage 2 (Release 15)," May 2017, 13 pages.
3GPP TS 38.331 V0.0.1, "3rd Generation Partnership Project; Technical Specification Group Radio Access Network, NR, Radio Resource Control (RRC), Protocol specification (Release 15)," Mar. 2017, 13 pages.
CATT, "Discussion on MN/SN combined procedures," 3GPP TSG-RAN WG2 Meeting #97bis, R2-1703095, Spokane, USA, Apr. 3-7, 2017, 2 pages.
EPO Partial Supplementary European Search Report issued in European Application No. 18794482.2 on May 12, 2020, 13 pages.
Ericsson, "SCG SRB configuration and use in LTE-NR interworking," 3GPP TSG-RAN WG2 #97bis, R2-1702705, Spokane, USA, Apr. 3-7, 2017, 5 pages.
Ericsson, "UE capability coordination for LTE-NR interworking," 3GPP TSG-RAN WG2 #97bis, R2-1702715, Spokane, USA, Apr. 3-7, 2017, 6 pages.
Ericsson, "UE capability signalling for tight interworking," 3GPP TSG-RAN WG2 #96, Tdoc R2-168296; Reno, Nevada, XP051193002, Nov. 14-18, 2016, 3 pages.
Extended European Search Report issued in European Application No. 18794482.2 on Sep. 15, 2020, 16 pages.
Huawei, HiSilicon, "UE inter RAT capability handling for LTE-NR tight interworking and normal scenario," 3GPP TSG-RAN WG2 Meeting #97bis, R2-1703652, Spokane, USA, Apr. 3-7, 2017, 3 pages.
Nokia, Alcatel-Lucent Shanghai Bell, "On UE capability and network node coordination aspects in LTE-NR tight interworking," 3GPP TSG-RAN WG2 Meeting #95bis, R2-166243, Kaohsiung, Taiwan, Oct. 10-14, 2016, 9 pages.
Nokia, Alcatel-Lucent Shanghai Bell, "S-RLF with Tight Interworking," 3GPP TSG-RAN WG2 Meeting #97bis, R2-1702631, Spokane, USA, Apr. 3-7, 2017, 5 pages.
Office Action issued in Indian Application No. 201937037003 on Mar. 8, 2021, 6 pages.
Office Action issued in Japanese Application No. 2019-550751 on Oct. 27, 2020, 8 pages { with English translation).
Office Action issued in Japanese Application No. 2021-010498 on Mar. 8, 2022, 8 pages (with English translation).
Office Action issued in Korean Application No. 2019-7028670 on Dec. 23, 2020, 14 pages (with English ranslation).
Office Action issued in Korean Application No. 2021-7005458 on May 21, 2021, 15 pages (with English translation).
Office Action issued in Russian Application No. 2019134196/07(067390) on Sep. 1, 2021, 16 pages (with English translation).
PCT International Search Report and Written Opinion in International Application No. PCT/CN2018/085710, dated Jul. 19, 2018, 15 pages (With English Translation).
Qualcomm Incorporated, "User Plane Details for Handover without WT Change," 3GPP TSG-RAN2 Meeting #95bis, R2-167114, Kaohsiung, Taiwan, Oct. 10-14, 2016, 5 pages.
ZTE et al., "Consideration on the capability coordination for LTE/NR tight interworking," 3GPP TSG-RAN WG2 Meeting #97bis, R2-1702833, Apr. 3-7, 2017, 8 pages.
ZTE et al., "Consideration on the handling of RRC procedure failure in LTE/NR tight interworking," 3GPP TSG-RAN WG2 Meeting #97bis, R2-1702830, Spokane, USA, Apr. 3-7, 2017, 3 pages.
ZTE, "Further Consideration on Xn Procedures for NR/NR Tight-Interworking," 3GPP TSG RAN WG3#95, R3-170533, Athens, Greece, Feb. 13-17, 2017, 3 pages.

* cited by examiner

FAILURE PROCESSING METHOD, HANDOVER METHOD, TERMINAL DEVICE, AND NETWORK DEVICE

CROSS-REFERENCE TO RELATED APPLICATIONS

This application is a continuation of U.S. patent application Ser. No. 16/573,465, filed on Sep. 17, 2019, which is a continuation of International Application No. PCT/CN2018/085710, filed on May 4, 2018, which claims priority to Chinese Patent Application No. 201710314196.5, filed on May 5, 2017. All of the afore-mentioned patent applications are hereby incorporated by reference in their entireties.

TECHNICAL FIELD

This application relates to the field of wireless communication technologies, and in particular, to a failure processing method, a handover method, a terminal device, and a network device in a wireless communications system.

BACKGROUND

FIG. 1 shows a multi-connectivity scenario. One terminal device is connected to one primary network device and at least one secondary network device (one secondary network device is used as an example in the figure). The primary network device and the at least one secondary network device are connected to a core network. A standard of the primary network device and a standard of the secondary network device may be the same or different. When the standards of the two network devices are different, for example, one is a long term evolution (LTE) base station, and the other is a new radio (NR) base station, how the secondary network device sends a radio resource control (RRC) configuration to the terminal device and how the terminal device performs feedback when determining that the RRC configuration fails both need to be resolved.

SUMMARY

This application provides a failure processing method, a handover method, a terminal device, and a network device, to provide a manner in which a terminal receives an RRC configuration of a secondary network device and feeds back an RRC configuration failure.

According to a first aspect, this application provides a failure processing method, including:
  receiving, by a terminal device, a first RRC configuration of a secondary network device from the secondary network device; and
  sending, by the terminal device, first indication information to a primary network device, where the first indication information is used to indicate that the first RRC configuration fails.

In this application, the terminal device directly receives the first RRC configuration of the secondary network device from the secondary network device. When the first RRC configuration fails, the terminal device sends the first indication information to the primary network device to indicate that the first RRC configuration fails. A speed is higher because the terminal device may directly receive the RRC configuration from the secondary network device. In addition, when the first RRC configuration fails, the terminal reports one piece of first indication information to the primary network device to indicate that the first RRC configuration fails. Therefore, the primary network device can determine, according to the received first indication information, that the first RRC configuration fails, and then can trigger a subsequent operation.

Optionally, the sending, by the terminal device, first indication information to a primary network device includes: sending, by the terminal device, a first message to the primary network device, where the first message includes the first indication information. Optionally, the first message is an RRC connection reestablishment message.

Optionally, the sending, by the terminal device, first indication information to a primary network device includes: sending, by the terminal device, the first indication information to the primary network device if a first unit of the terminal device receives second indication information sent by a second unit of the terminal device, where the second indication information is used to indicate that the first RRC configuration received from the secondary network device fails, the first unit is configured to control an RRC connection between the primary network device and the terminal device, and the second unit is configured to control an RRC connection between the secondary network device and the terminal device. Optionally, the first unit is a first RRC entity, and the second unit is a second RRC entity.

Optionally, the terminal device receives a new RRC configuration from the secondary network device.

According to a second aspect, an embodiment of this application provides a terminal device, where the terminal device may implement any method provided in the first aspect.

In a possible design, the terminal device has a function of implementing behavior of the terminal device in any method in the first aspect, and the function may be implemented by hardware, or may be implemented by hardware by executing corresponding software. The hardware or the software includes one or more modules corresponding to the foregoing function. Optionally, the terminal device may be user equipment. The terminal device may be configured to directly receive a first RRC configuration of a secondary network device from the secondary network device. When the first RRC configuration fails, the terminal device sends first indication information to a primary network device to indicate that the first RRC configuration fails. A speed is higher because the terminal device may directly receive the RRC configuration from the secondary network device. In addition, when the first RRC configuration fails, the terminal reports one piece of first indication information to the primary network device to indicate that the first RRC configuration fails. Therefore, the primary network device can determine, according to the received first indication information, that the first RRC configuration fails, and then can trigger a subsequent operation.

In a possible design, a structure of the terminal device includes a processor and a transceiver, and the processor is configured to support the terminal device in performing a corresponding function in any method in the first aspect, for example, generating, receiving, or processing data and/or information in the method. The transceiver is configured to: support communication between the terminal device and another entity, and send or receive information or an instruction in any method in the first aspect to or from the another entity. The terminal device may further include a memory. The memory is configured to be coupled to the processor, and the memory stores a program instruction and data that are necessary for the terminal device.

According to a third aspect, this application provides a failure processing method, including:

receiving, by a terminal device, a second RRC configuration of a secondary network device from a primary network device; and sending, by the terminal device, a second message to the primary network device if the second RRC configuration fails, where the second message is used to request RRC connection reestablishment.

In this application, the terminal device receives the second RRC configuration of the secondary network device from the primary network device. When the second RRC configuration fails, the terminal device sends the second message to the primary network device to request RRC connection reestablishment, to enable that the terminal device can obtain a correct RRC configuration through the request.

Optionally, the second message includes third indication information, and the third indication information is used to indicate that the second RRC configuration fails.

Optionally, the sending, by the terminal device, a second message to the primary network device if the second RRC configuration fails includes: sending, by the terminal device, the second message to the primary network device if a first unit of the terminal device receives fourth indication information sent by a second unit of the terminal device, where the fourth indication information is used to indicate that the second RRC configuration received from the primary network device fails, the first unit is configured to control an RRC connection between the primary network device and the terminal device, and the second unit is configured to control an RRC connection between the secondary network device and the terminal device. Optionally, the first unit is a first RRC entity, and the second unit is a second RRC entity.

Optionally, the terminal device receives a third RRC configuration of the primary network device from the primary network device. If the third RRC configuration fails, the terminal device performs at least one of the following actions: stopping executing the second RRC configuration, releasing the second RRC configuration, and suspending a radio bearer of the secondary network device.

According to a fourth aspect, an embodiment of this application provides a terminal device, where the terminal device may implement any method provided in the third aspect.

In a possible design, the terminal device has a function of implementing behavior of the terminal device in any method in the third aspect, and the function may be implemented by hardware, or may be implemented by hardware by executing corresponding software. The hardware or the software includes one or more modules corresponding to the foregoing function. Optionally, the terminal device may be user equipment. The terminal device may be configured to receive a second RRC configuration of a secondary network device from a primary network device. When the second RRC configuration fails, the terminal device sends a second message to the primary network device to request RRC connection reestablishment, to enable that the terminal device can obtain a correct RRC configuration through the request.

In a possible design, a structure of the terminal device includes a processor and a transceiver, and the processor is configured to support the terminal device in performing a corresponding function in any method in the third aspect, for example, generating, receiving, or processing data and/or information in the method. The transceiver is configured to: support communication between the terminal device and another entity, and send or receive information or an instruction in any method in the third aspect to or from the another entity. The terminal device may further include a memory. The memory is configured to be coupled to the processor, and the memory stores a program instruction and data that are necessary for the terminal device.

According to a fifth aspect, this application provides a failure processing method, including:

receiving, by a primary network device, first indication information from a terminal device, where the first indication information is used to indicate that a first RRC configuration of a secondary network device fails, and the first RRC configuration is received by the terminal device from the secondary network device; and sending, by the primary network device, a first request message to the secondary network device, where the first request message is used to request the secondary network device to update an RRC configuration or request to release the secondary network device.

Optionally, the first request message includes the first indication information.

According to a sixth aspect, an embodiment of this application provides a network device, where the network device may implement any method provided in the fifth aspect.

In a possible design, the network device has a function of implementing behavior of the primary network device in any method in the fifth aspect, and the function may be implemented by hardware, or may be implemented by hardware by executing corresponding software. The hardware or the software includes one or more modules corresponding to the foregoing function. Optionally, the network device may be a base station, a transmission reception point, or the like. The network device may be configured to receive first indication information from a terminal device, where the first indication information is used to indicate that a first RRC configuration of a secondary network device fails. The primary network device sends a first request message to the secondary network device, where the first request message is used to request the secondary network device to update an RRC configuration or request to release the secondary network device.

In a possible design, a structure of the network device includes a processor and a transceiver; and the processor is configured to support the network device in performing a corresponding function in any method in the fifth aspect, for example, generating, receiving, or processing data and/or information in the method. The transceiver is configured to: support communication between the network device and another entity, and send or receive information or an instruction in any method in the fifth aspect to or from the another entity. The network device may further include a memory. The memory is configured to be coupled to the processor, and the memory stores a program instruction and data that are necessary for the network device.

According to a seventh aspect, this application provides a failure processing method, including:

receiving, by a primary network device, a second message from a terminal device if a second RRC configuration of a secondary network device fails, where the second message is used to indicate RRC connection reestablishment, and the second RRC configuration is received by the terminal device from the primary network device; and sending, by the primary network device, a sixth message to the terminal device, where the sixth message is used to reestablish a signaling radio bearer (SRB).

Optionally, the second message includes third indication information, and the third indication information is used to indicate that the second RRC configuration fails.

According to an eighth aspect, an embodiment of this application provides a network device, where the network device may implement any method provided in the seventh aspect.

In a possible design, the network device has a function of implementing behavior of the primary network device in any method in the seventh aspect, and the function may be implemented by hardware, or may be implemented by hardware by executing corresponding software. The hardware or the software includes one or more modules corresponding to the foregoing function. Optionally, the network device may be a base station, a transmission reception point, or the like. The network device may be configured to receive a second message from a terminal device if a second RRC configuration of a secondary network device fails, where the second message is used to indicate RRC connection reestablishment. The primary network device sends a sixth message to the terminal device, where the sixth message is used to reestablish an SRB.

In a possible design, a structure of the network device includes a processor and a transceiver, and the processor is configured to support the network device in performing a corresponding function in any method in the seventh aspect, for example, generating, receiving, or processing data and/or information in the method. The transceiver is configured to: support communication between the network device and another entity, and send or receive information or an instruction in any method in the seventh aspect to or from the another entity. The network device may further include a memory. The memory is configured to be coupled to the processor, and the memory stores a program instruction and data that are necessary for the network device.

According to a ninth aspect, this application provides a handover method, including:

sending, by a first primary network device, a third message to a second primary network device, where the third message is used to request handover, and the third message includes a capability coordination result between the first primary network device and a secondary network device; and receiving, by the first primary network device, a configuration of the second primary network device that is sent by the second primary network device, where the configuration of the second primary network device is associated with the capability coordination result.

In this application, the first primary network device directly sends the capability coordination result between the first primary network device and the secondary network device to the second primary network device, so that the second primary network device generates the configuration based on the capability coordination result without obtaining and understanding a configuration of the secondary network device, and it can be enabled that the second primary network device can successfully generate the configuration in a handover process.

Optionally, the capability coordination result includes a size of a layer 2 buffer that can be used by the first primary network device and/or a band combination that can be used by the first primary network device.

Optionally, the first primary network device receives a configuration of the secondary network device; and the first primary network device sends the configuration of the second primary network device and the configuration of the secondary network device to a terminal device.

Optionally, the receiving, by the first primary network device, a configuration of the secondary network device includes: receiving, by the first primary network device, the configuration of the secondary network device from the second primary network device.

Optionally, the first primary network device receives a fourth message from the terminal device if the configuration of the secondary network device fails, where the fourth message is used to indicate RRC connection reestablishment.

According to a tenth aspect, an embodiment of this application provides a network device, where the network device may implement any method provided in the ninth aspect.

In a possible design, the network device has a function of implementing behavior of the first primary network device in any method in the ninth aspect, and the function may be implemented by hardware, or may be implemented by hardware by executing corresponding software. The hardware or the software includes one or more modules corresponding to the foregoing function. Optionally, the network device may be a base station, a transmission reception point, or the like. The network device may be configured to directly send a capability coordination result between the first primary network device and a secondary network device to a second primary network device, so that the second primary network device generates a configuration based on the capability coordination result without obtaining and understanding a configuration of the secondary network device, and it can be enabled that the second primary network device can successfully generate the configuration in a handover process.

In a possible design, a structure of the network device includes a processor and a transceiver, and the processor is configured to support the network device in performing a corresponding function in any method in the ninth aspect, for example, generating, receiving, or processing data and/or information in the method. The transceiver is configured to: support communication between the network device and another entity, and send or receive information or an instruction in any method in the ninth aspect to or from the another entity. The network device may further include a memory. The memory is configured to be coupled to the processor, and the memory stores a program instruction and data that are necessary for the network device.

According to an eleventh aspect, an embodiment of this application provides a communications device, including a first unit and a second unit, where the second unit generates second indication information if the second unit determines that a first RRC configuration of a secondary network device that is received by the communications device from the secondary network device fails, where the second indication information is used to indicate that the first RRC configuration fails; and the second unit sends the second indication information to the first unit, where the first unit is configured to control an RRC connection between a primary network device and the communications device, and the second unit is configured to control an RRC connection between the secondary network device and the communications device.

Optionally, the first unit is a first RRC entity, and the second unit is a second RRC entity.

According to a twelfth aspect, an embodiment of this application provides a communications device, including a first unit and a second unit, where the second unit generates fourth indication information if the second unit determines that a second RRC configuration of a secondary network device that is received by the communications device from a primary network device fails, where the fourth indication information is used to indicate that the second RRC configuration fails; and the second unit sends the fourth indication information to the first unit, where the first unit is configured to control an RRC connection between the primary network device and the communications device, and the second unit is configured to control an RRC connection between the secondary network device and the communications device.

Optionally, the first unit is a first RRC entity, and the second unit is a second RRC entity.

According to a thirteenth aspect, an embodiment of this application provides a communications device, including a first unit and a second unit, where the first unit generates fifth indication information if the first unit determines that a third RRC configuration of a secondary network device that is received by the communications device from a primary network device fails, where the fifth indication information is used to indicate that the third RRC configuration fails; and the first unit sends the fifth indication information to the second unit, where the first unit is configured to control an RRC connection between the primary network device and the communications device, and the second unit is configured to control an RRC connection between the secondary network device and the communications device.

Optionally, the first unit is a first RRC entity, and the second unit is a second RRC entity.

According to a fourteenth aspect, an embodiment of this application provides a communications device, including a first unit and a second unit, where the second unit sends failure indication information to the first unit, where the failure indication information is used to indicate that a link between the communications device and a secondary network device fails; and the first unit receives the failure indication information, where the first unit is configured to control an RRC connection between a primary network device and the communications device, and the second unit is configured to control an RRC connection between the secondary network device and the communications device.

Optionally, the failure indication information is specifically used to indicate any one of the following cases: a timer expires, a quantity of retransmission times exceeds a maximum quantity of times, random access fails, a secondary-cell group change fails, a key fails, a check fails, integrity protection fails, a secondary network configuration received from the secondary network device fails, and a secondary network configuration received from a primary network device fails.

Optionally, the first unit is a first RRC entity, and the second unit is a second RRC entity.

The communications device in the tenth to the fourteenth aspects may be, for example, a terminal device or a baseband chip.

According to a fifteenth aspect, an embodiment of this application provides a computer storage medium, configured to store a computer software instruction used by the terminal device provided in the second aspect, and the computer software instruction includes a program designed to execute the method in the first aspect; or configured to store a computer software instruction used by the network device provided in the fourth aspect, and the computer software instruction includes a program designed to execute the method in the third aspect.

According to a sixteenth aspect, an embodiment of this application provides a computer storage medium, configured to store a computer software instruction used by the terminal device provided in the sixth aspect, and the computer software instruction includes a program designed to execute the method in the fifth aspect; or configured to store a computer software instruction used by the network device provided in the eighth aspect, and the computer software instruction includes a program designed to execute the method in the seventh aspect; or configured to store a computer software instruction used by the terminal device provided in the tenth aspect, and the computer software instruction includes a program designed to execute the method in the ninth aspect.

According to a seventeenth aspect, this application further provides a computer program product that includes an instruction, and when the computer program product runs on a computer, the computer is enabled to perform the method according to the first aspect or the third aspect. The computer program product includes a computer execution instruction, and the computer execution instruction is stored in a computer-readable storage medium. A processor of a terminal device may read the computer execution instruction from the computer-readable storage medium. The processor executes the computer execution instruction, so that the terminal device performs a step performed by the terminal device in the foregoing methods provided in the embodiments of this application, or a functional unit corresponding to the step is deployed for the terminal device.

According to an eighteenth aspect, this application further provides a computer program product that includes an instruction, and when the computer program product runs on a computer, the computer is enabled to perform the method according to the fifth aspect or the seventh aspect. The computer program product includes a computer execution instruction, and the computer execution instruction is stored in a computer-readable storage medium. A processor of a network device may read the computer execution instruction from the computer-readable storage medium. The processor executes the computer execution instruction, so that the network device performs a step performed by the primary network device in the foregoing methods provided in the embodiments of this application, or a functional unit corresponding to the step is deployed for the network device.

According to a nineteenth aspect, this application further provides a computer program product that includes an instruction, and when the computer program product runs on a computer, the computer is enabled to perform the method according to the ninth aspect. The computer program product includes a computer execution instruction, and the computer execution instruction is stored in a computer-readable storage medium. A processor of a network device may read the computer execution instruction from the computer-readable storage medium. The processor executes the computer execution instruction, so that the network device performs a step performed by the first primary network device in the foregoing method provided in the embodiments of this application, or a functional unit corresponding to the step is deployed for the network device.

According to a twentieth aspect, this application further provides a chip system. The chip system includes a processor, configured to support a terminal device in implementing the functions in the foregoing aspects, for example, generating, receiving, or processing data and/or information in the foregoing methods. In a possible design, the chip system further includes a memory. The memory is configured to store a program instruction and data that are necessary for the terminal device. The chip system may include a chip, or may include a chip and another discrete device.

According to a twenty-first aspect, this application further provides a chip system. The chip system includes a processor, configured to support a network device in implementing the functions in the foregoing aspects, for example, generating, receiving, or processing data and/or information in the foregoing methods. In a possible design, the chip system further includes a memory. The memory is configured to store a program instruction and data that are necessary for the network device. The chip system may include a chip, or may include a chip and another discrete device.

DESCRIPTION OF EMBODIMENTS

Figure 1:
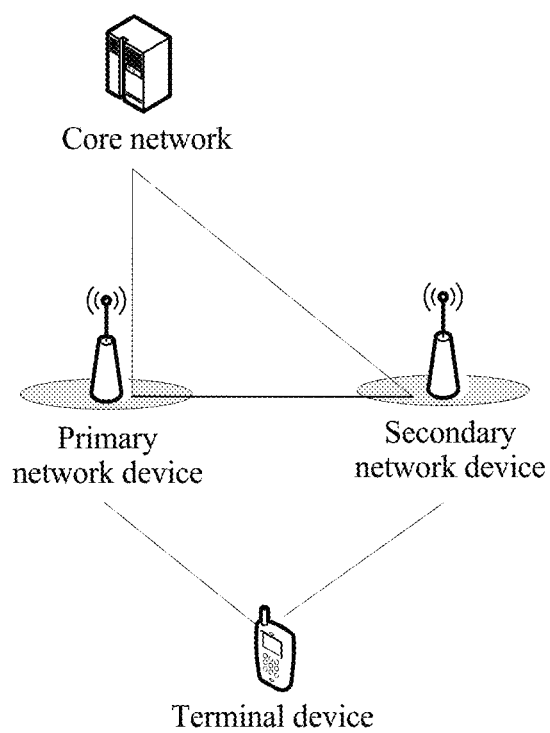
FIG. 1 is a schematic diagram of multi-connectivity according to this application.

The following clearly describes technical solutions in the embodiments of this application with reference to the accompanying drawings in the embodiments of this application.

Network architectures and service scenarios described in the embodiments of this application are intended to describe the technical solutions in the embodiments of this application more clearly, but do not constitute a limitation to the technical solutions provided in the embodiments of this application. A person of ordinary skill in the art may know that as the network architectures evolve and a new service scenario emerges, the technical solutions provided in the embodiments of this application are also applicable to a similar technical problem.

This application may be applied to an existing cellular communications system, for example, systems such as a global system for mobile communications (GSM), a wideband code division multiple access (WCDMA) system, and a long term evolution (LTE) system; or is applicable to a 5th generation mobile communications system (5rd-Generation, 5G for short) system, for example, communications systems such as an access network that uses new radio (NR), a cloud radio access network (CRAN), and an LTE access network connected to a 5G core network; or may be extended to a similar wireless communications system, such as a wireless fidelity (Wireless-Fidelity, Wi-Fi for short) system, a worldwide interoperability for microwave access (WiMAX) system, and another related cellular system in the 3rd Generation Partnership Project (3GPP); or is applicable to another wireless communications system that uses an orthogonal frequency division multiplexing (OFDM) access technology; and is also applicable to a future wireless communications system.

For ease of understanding, some terminologies in this application are described below.

(1) A terminal device, also referred to as user equipment (UE) or a terminal, is a device that provides a user with voice and/or data connectivity, for example, a handheld device, an in-vehicle device, a wearable device, a computing device, or a control device having a wireless connection function or a wireless communication function, or another processing device connected to a wireless modem, and mobile stations (MS) in various forms. Common terminal devices include a mobile phone, a tablet computer (pad), a notebook computer, a palmtop computer, a mobile internet device (MID), and a wearable device such as a smartwatch, a smart band, or a pedometer. For ease of description, in this application, the devices mentioned above are collectively referred to as terminal devices.

(2) A network device may be, for example, a base station, and is a device that connects a terminal device to a wireless network. The network device includes but is not limited to an evolved NodeB (eNB), a radio network controller (RNC), a NodeB (NB), a base station controller (BSC), a base transceiver station (BTS), a home eNodeB (for example, Home evolved NodeB or Home Node B, HNB for short), a baseband unit (BBU), a new radio NodeB (g NodeB, gNB for short), a transmission reception point (TRP), a transmitting point (TP), a mobile switching center, and the like. In addition, the network device may include a Wi-Fi access point (AP) and the like. An apparatus that directly communicates with the terminal device through a wireless channel is usually a base station. The base station may include various forms of macro base stations, micro base stations, relay stations, access points, remote radio units (RRU), and the like. Certainly, another network device having a wireless communication function may wirelessly communicate with the terminal device. This is not uniquely limited in this application. In different systems, a device having a function of a base station may have a different name. For example, in an LTE network, the device is referred to as an evolved NodeB (eNB); and in a 3rd generation (3G) network, the device is referred to as a NodeB.

The term "and/or" in this application describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The following describes in more detail the solutions provided in the embodiments of this application with reference to the accompanying drawings.

Figure 2A:
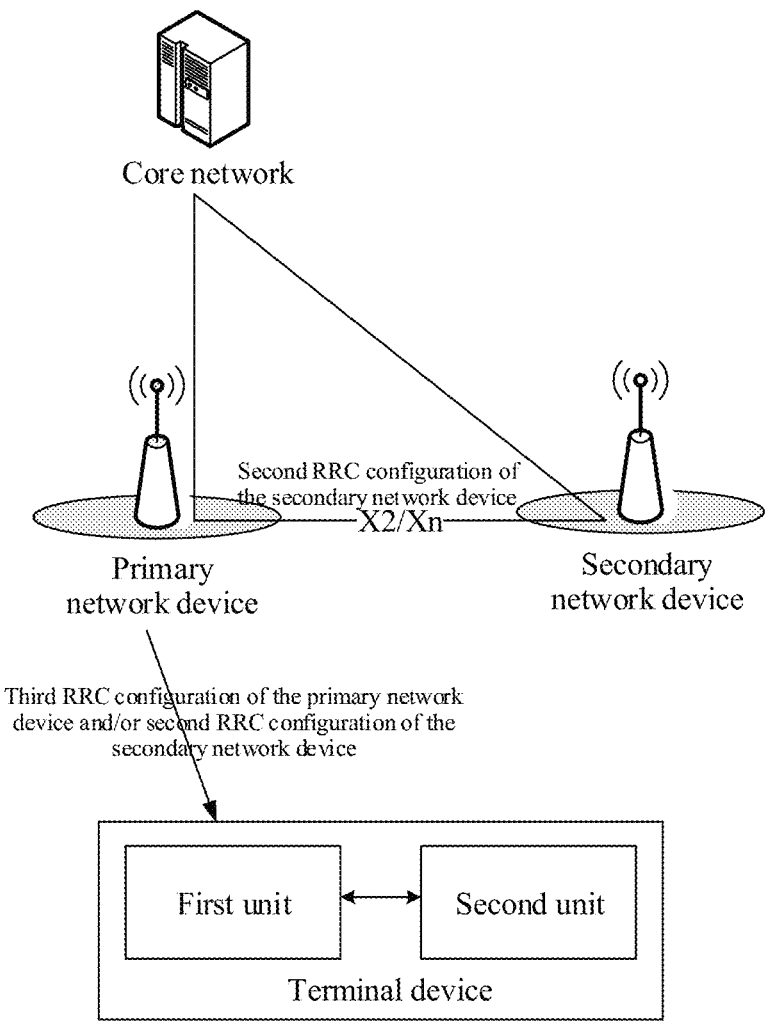
FIG. 2(a) is a structural diagram of a network according to this application.

FIG. 2(a) is a structural diagram of a network according to this application. A terminal device may interact with a primary network device and at least one secondary network device (one secondary network device is used as an example in the figure), and the terminal device includes a first unit and a second unit. The first unit may be a first RRC entity, a first RRC functional unit, or a first RRC unit, and is configured to control an RRC connection between the primary network device and the terminal device. The second unit may be a second RRC entity, a second RRC functional unit, or a second RRC unit, and is configured to control an RRC connection between the secondary network device and the terminal device.

For example, a core network is an evolved packet core (EPC). The primary network device is an LTE base station (such as an eNB), and a control plane connection and a user plane connection may be established between the primary network device and the EPC for the terminal device. The secondary network device is an NR base station (such as a gNB), and only a user plane connection can be established between the secondary network device and the EPC. The first unit is an LTE RRC entity, and is responsible for managing LTE radio resources. The second unit is an NR RRC entity, and is responsible for managing NR radio resources. In addition, for example, an S1 interface may be used between the core network and the primary network device; an S1 interface may be used between the core network and the secondary network device; and an X2 interface may be used between the primary network device and the secondary network device.

For another example, a core network is a next generation core (NGC), a 5G core network (5G-CN), or a 5G core (5GC). An example in which the core network is an NGC is used for description below. The primary network device is an LTE base station (such as an eNB), and a control plane connection and a user plane connection may be established between the primary network device and the NGC for the terminal device. The secondary network device is an NR base station (such as a gNB), and only a user plane connection can be established between the secondary network device and the NGC. The first unit is an LTE RRC entity, and is responsible for LTE radio resources. The second unit is an NR RRC entity, and is responsible for managing NR radio resources. In addition, for example, a next generation (NG) interface may be used between the core network and the primary network device; an NG interface may be used between the core network and the secondary network device; and an Xn interface (namely, a next generation interface) may be used between the primary network device and the secondary network device.

For another example, a core network is an NGC, a 5G-CN, or a 5GC. An example in which the core network is an NGC is used for description below. The primary network device is an NR base station (such as a gNB), and a control plane connection and a user plane connection may be established between the primary network device and the NGC for the terminal device. The secondary network device is an LTE base station (such as an eNB), and only a user plane connection can be established between the secondary network device and the NGC. The first unit is an NR RRC entity, and is responsible for managing NR radio resources. The second unit is an LTE RRC entity, and is responsible for managing LTE radio resources. In addition, for example, an NG interface may be used between the core network and the primary network device; an NG interface may be used between the core network and the secondary network device; and an Xn interface (namely, a next generation interface) may be used between the primary network device and the secondary network device.

Certainly, alternatively, the core network may be another core network, the primary network device may be another network device, such as various types of network devices mentioned above, and the secondary network device may also be another network device, such as various types of network devices mentioned above.

In this application, standards of the primary network device and the secondary network device may be the same or different. The following mainly provides description for a case in which the standards of the primary network device and the secondary network device are different. For example, the primary network device is an LTE base station, and the secondary network device is an NR base station; or the primary network device is an NR base station, and the secondary network device is an LTE base station. In addition, for ease of description, in this application, the first unit has a same standard as the primary network device, and the second unit has a same standard as the secondary network device. For example, when the primary network device is an NR base station, and the secondary network device is an LTE base station, the first unit is responsible for managing NR radio resources, for example, the first unit is an NR RRC entity; and the second unit is responsible for managing LTE radio resources, for example, the second unit is an LTE RRC entity. For another example, when the primary network device is an LTE base station, and the secondary network device is an NR base station, the first unit is responsible for managing LTE radio resources, for example, the first unit is an LTE RRC entity; and the second unit is responsible for managing NR radio resources, for example, the second unit is an NR RRC entity.

The terminal device may obtain radio resources from both an air interface of the primary network device and an air interface of the secondary network device to transmit data, thereby obtaining a gain of a transmission rate.

In this application, the first unit and the second unit are responsible for configurations in their respective standards, and do not understand each other's configuration.

The primary network device and the secondary network device are independent of each other. From a perspective of a network side, the primary network device and the secondary network device each have RRC and may generate a complete RRC message. In a scenario shown in FIG. 2(a), an RRC message (carrying an RRC configuration of the secondary network device) generated by the secondary network device is sent to the primary network device; and the primary network device uses the RRC message of the secondary network device as a container, adds the container to an RRC message of the primary network device, and sends the RRC message of the primary network device to the terminal device. In other words, the terminal device receives the RRC message of the primary network device from the primary network device, the RRC message includes an RRC configuration of the primary network device and the RRC configuration of the secondary network device, and the RRC configuration of the secondary network device in the RRC message of the primary network device is sent by the secondary network device to the primary network device by using the RRC message of the secondary network device.

In an RRC configuration manner shown in FIG. 2(a), which is also referred to as joint configuration in this application, the secondary network device sends the RRC configuration of the secondary network device to the primary network device, and the primary network device then sends the RRC configuration of the secondary network device to the terminal device; in addition, the primary network device may further send the RRC configuration of the primary network device to the terminal device. In other words, in the joint configuration scenario, the RRC configuration of the secondary network device needs to be sent to the terminal device by using the primary network device.

Figure 2B:
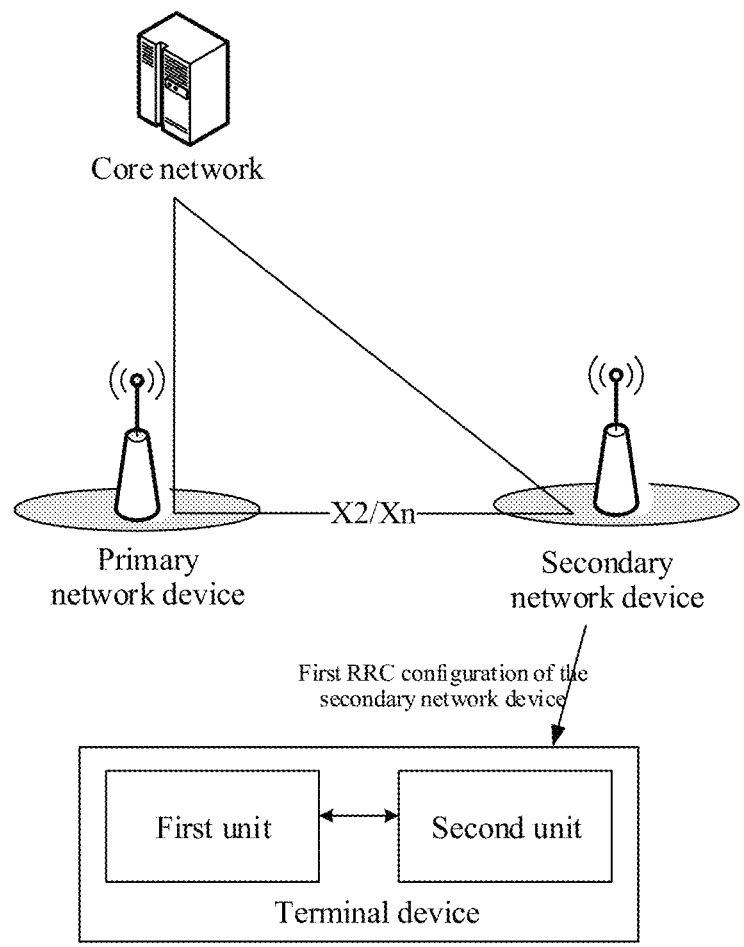
FIG. 2(b) is a structural diagram of another network according to this application.

FIG. 2(b) is a structural diagram of another network according to this application. A core network, a primary network device, a secondary network device, a first unit, and a second unit in FIG. 2(b) have same types and same mutual relationships as the core network, the primary network device, the secondary network device, the first unit, and the second unit in FIG. 2(a). For details, refer to the foregoing description. A main difference between FIG. 2(b) and FIG. 2(a) is as follows: in FIG. 2(b), the secondary network device may directly send an RRC message to a terminal device, where the RRC message carries an RRC configuration of the secondary network device; and the primary network device sends an RRC message to the terminal device, where the RRC message carries an RRC configuration of the primary network device. Therefore, in an RRC configuration manner shown in FIG. 2(b), which is also referred to as independent configuration in this application, the RRC configuration of the primary network device and the RRC configuration of the secondary network device are independently sent by the primary network device and the secondary network device to the terminal device, respectively.

The following describes in detail two failure processing methods provided in this application with reference to FIG. 2(a) and FIG. 2(b) respectively.

Figure 3A:
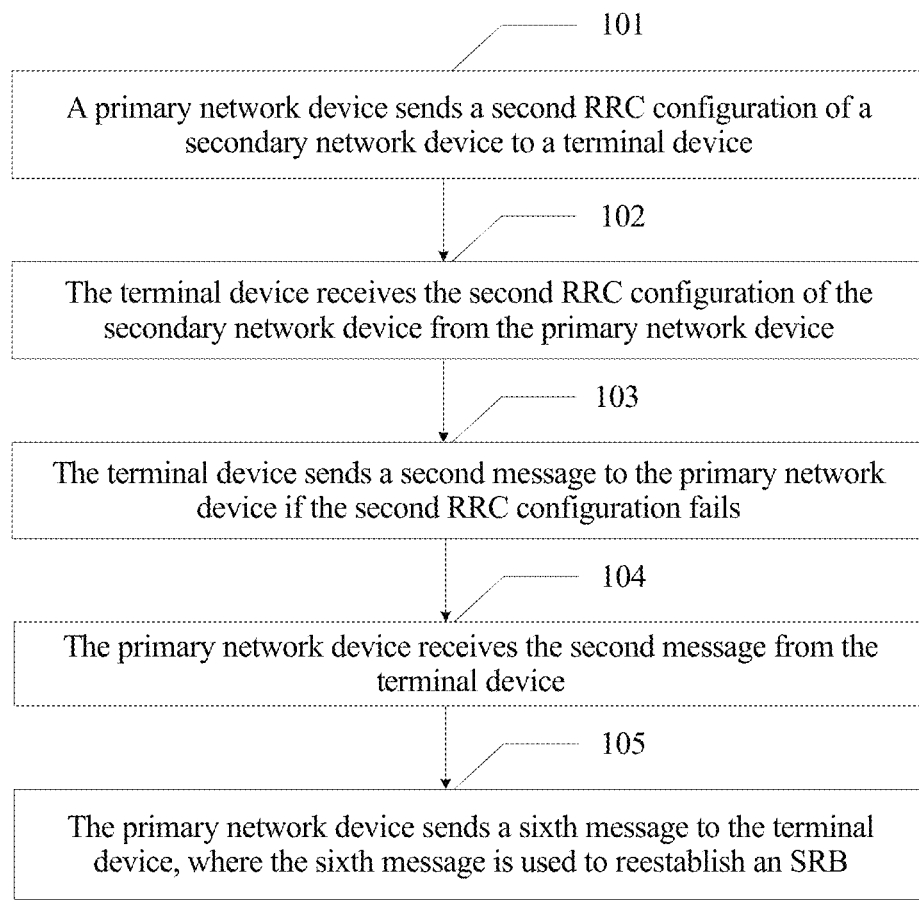
FIG. 3(a) is a flowchart of a failure processing method according to this application.

FIG. 3(a) is a flowchart of a failure processing method according to this application. The method corresponds to the scenario shown in FIG. 2(a), namely, the joint configuration scenario, and specifically includes the following steps.

Step 101: A primary network device sends a second RRC configuration of a secondary network device to a terminal device.

An RRC configuration is configuration information generated by an RRC entity of a network device, and is used to configure a terminal device. For example, the RRC configuration includes configurations of protocol layers, and includes but is not limited to a packet data convergence protocol (PDCP) configuration, a radio link control (RLC) configuration, a media access control (MAC) configuration, and a physical layer configuration.

Optionally, the secondary network device adds the second RRC configuration of the secondary network device to an RRC message of the secondary network device, and sends the RRC message of the secondary network device to the primary network device. After receiving the RRC message of the secondary network device, the primary network device adds the RRC configuration of the secondary network device to an RRC message of the primary network device, and sends the RRC message of the primary network device to the terminal device. Optionally, the RRC message of the primary network device further carries a third RRC configuration of the primary network device.

Step 102: The terminal device receives the second RRC configuration of the secondary network device from the primary network device.

Step 103: The terminal device sends a second message to the primary network device if the second RRC configuration fails.

The second message is used to request RRC connection reestablishment. Optionally, the second message is an RRC connection reestablishment message. Optionally, the second message includes third indication information, and the third indication information is used to indicate that the second RRC configuration fails.

In a possible implementation, referring to FIG. 2(a), a second unit of the terminal device generates fourth indication information if the second unit determines that the second RRC configuration of the secondary network device that is received by the terminal device from the primary network device fails, where the fourth indication information is used to indicate that the second RRC configuration fails. Then, the second unit sends the fourth indication information to a first unit. The terminal device sends the second message to the primary network device if the first unit receives the fourth indication information sent by the second unit. The second unit may be a second RRC entity of the terminal device.

In another possible implementation, referring to FIG. 2(a), a second unit of the terminal device generates seventh indication information if the second unit determines that the second RRC configuration of the secondary network device that is received by the terminal device from the primary network device succeeds, where the seventh indication information is used to indicate that the second RRC configuration succeeds. Then, the second unit sends the seventh indication information to a first unit. The terminal device sends a fifth message to the primary network device if the first unit receives the seventh indication information sent by the second unit, where the fifth message is used to indicate that the second RRC configuration succeeds. The second unit may be a second RRC entity of the terminal device.

Step 104: The primary network device receives the second message from the terminal device.

Step 105: The primary network device sends a sixth message to the terminal device, where the sixth message is used to reestablish an SRB.

In step 101 to step 105, the terminal device receives the second RRC configuration of the secondary network device from the primary network device; when the terminal device determines that the second RRC configuration fails, to be specific, the second unit of the terminal device determines that the second RRC configuration fails, and sends the fourth indication information to the first unit, the terminal device sends the second message to the primary network device to request the RRC connection reestablishment; and after receiving the second message, the primary network device sends a RRC connection reestablishment message.

Optionally, before or after any one of step 101 to step 105, the method further includes:
the terminal device receives the third RRC configuration of the primary network device from the primary network device; and if the third RRC configuration fails, the terminal device performs at least one of the following actions: stopping executing the second RRC configuration, releasing the second RRC configuration, and suspending a radio bearer of the secondary network device.

Optionally, that the terminal device performs at least one of the following actions includes: if the second unit receives fifth indication information sent by the first unit, the terminal device performs at least one of the following actions, where the fifth indication information is used to indicate that the third RRC configuration fails.

To be specific, when the terminal device further receives the third RRC configuration of the primary network device from the primary network device, and the third RRC configuration fails, the first unit sends the fifth indication information to the second unit to indicate that the third RRC configuration fails, and the terminal device further stops executing the second RRC configuration, and/or releases the second RRC configuration, and/or suspends the radio bearer of the secondary network device.

In addition, if the third RRC configuration fails, the terminal device further needs to perform the following operation:

the terminal device sends a seventh message to the primary network device, where the seventh message is used to request RRC connection reestablishment. Optionally, the seventh message includes seventh indication information, and the seventh indication information is used to indicate that the third RRC configuration of the primary network device that is received by the terminal device from the primary network device fails.

Figure 3B:
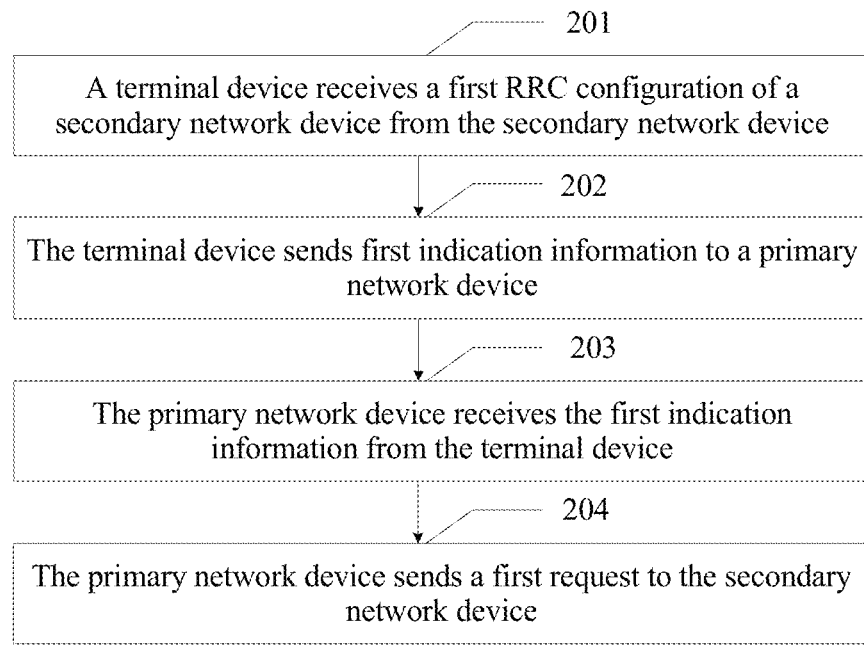
FIG. 3(b) is a flowchart of another failure processing method according to this application.

FIG. 3(b) is a flowchart of another failure processing method according to this application. The method corresponds to the scenario shown in FIG. 2(b), namely, an independent configuration scenario, and specifically includes the following steps.

Step 201: A terminal device receives a first RRC configuration of a secondary network device from the secondary network device.

Step 202: The terminal device sends first indication information to a primary network device.

The first indication information is used to indicate that the first RRC configuration fails.

Optionally, that the terminal device sends first indication information to a primary network device includes: the terminal device sends a first message to the primary network device, where the first message includes the first indication information.

Optionally, referring to FIG. 3(b), that the terminal device sends first indication information to a primary network device includes: the terminal device sends the first indication information to the primary network device if a first unit of the terminal device receives second indication information sent by a second unit of the terminal device, where the second indication information is used to indicate that the first RRC configuration received from the secondary network device fails. In other words, the second unit sends the second indication information to the first unit if the second unit determines that the first RRC configuration fails, and the terminal device sends the first indication information to the primary network device if the first unit receives the second indication information sent by the second unit.

Step 203: The primary network device receives the first indication information from the terminal device.

Step 204: The primary network device sends a first request message to the secondary network device.

The first request message is used to request the secondary network device to update an RRC configuration or request to release the secondary network device.

After updating the RRC configuration, the secondary network device sends a new RRC configuration to the primary network device. The primary network device sends the new RRC configuration to the terminal device. In other words, the terminal device receives the new RRC configuration from the primary network device.

It should be noted that an RRC connection reestablishment process is performed between the primary network device and user equipment in this case.

Alternatively, after updating the RRC configuration, the secondary network device directly sends a new RRC configuration to the terminal device. In other words, the terminal device receives the new RRC configuration from the secondary network device. In this method, the terminal device directly receives the new RRC configuration from the secondary network device, and therefore a speed is higher than a speed in the method for receiving the new RRC configuration of the secondary network device from the primary network device.

Optionally, the first request message includes the first indication information.

In an alternative solution of step 204, step 204 may alternatively be replaced with step 204a.

Step 204a: The primary network device releases the secondary network device.

After releasing the secondary network device, the primary network device may be further reconnected to a new secondary network device.

Optionally, in this application, the implementation methods shown in FIG. 3(a) and FIG. 3(b) may be used as a whole for understanding. To be specific, the terminal device may receive the first RRC configuration of the secondary network device from the secondary network device, and may also receive a second RRC configuration of the secondary network device from the primary network device.

The second unit sends failure indication information to the first unit if the terminal device determines that a link between the terminal device and the secondary network device fails. The failure indication information indicates a specific cause of the link failure. For example, the failure indication information is specifically used to indicate that a timer expires, a quantity of retransmission times exceeds a maximum quantity of times, random access fails, a secondary-cell group change fails, a key fails, a check fails, integrity protection fails, a secondary network configuration received from the secondary network device fails, or a secondary network configuration received from a primary network device fails.

The timer may be started when the terminal device detects that a physical layer problem occurs in a primary cell of the secondary network device. The quantity of retransmission times may be a quantity of times of performing retransmission at an RLC layer, or may be a quantity of times of performing retransmission at another layer. That random access fails may indicate that random access to a cell of the secondary network device by the terminal device fails. That a secondary-cell group change fails may indicate that the terminal device fails to change a secondary-cell group. The secondary-cell group may be a cell group, of the secondary network device, that serves the terminal device. That a key fails may indicate that the terminal device cannot normally perform encryption and/or decryption because of key inconsistency between the terminal device and the secondary network device. That a check fails may indicate checking performed by the terminal device and the secondary network device fails. That integrity protection fails may indicate that integrity protection between the terminal device and the secondary network device fails. For detailed contents, refer to related contents in 3GPP TS 36.331 and 3GPP TS 33.401. The foregoing description is merely used as an example, but no limitation is set to the foregoing description.

When the failure indication information is used to indicate that the secondary network configuration received from the secondary network device fails, the failure indication information is the second indication information described above.

When the failure indication information is used to indicate that the secondary network configuration received from the primary network device fails, the failure indication information is the fourth indication information described above.

Optionally, the failure indication information may be generated by the second unit when the second unit determines that the link between the terminal device and the secondary network device fails. Alternatively, a third unit of the terminal device may generate sixth indication information when determining that the link between the terminal device and the secondary network device fails, where the sixth indication information is used to indicate that the link between the terminal device and the secondary network device fails; the third unit sends the sixth indication information to the second unit; and after receiving the sixth indication information, the second unit generates the failure indication information. Alternatively, a third unit may generate failure indication information when determining that the link between the terminal device and the secondary network device fails, and then directly send the failure indication information to the first unit.

The third unit may be a second MAC entity, a second RLC entity, a second physical layer unit, or an application layer entity of the terminal device, and the second MAC entity, the second RLC entity, or the second physical layer unit has a same standard as the secondary network device.

After the first unit receives the failure indication information, the terminal device sends indication information to the primary network device if the failure indication information indicates that the timer expires, where the indication information is used to indicate that the timer expires. After receiving the indication information, the primary network device does not reestablish an RRC link.

After the first unit receives the failure indication information, the terminal device sends indication information to the primary network device if the failure indication information indicates that the quantity of retransmission times exceeds the maximum quantity of times, where the indication information is used to indicate that the quantity of retransmission times exceeds the maximum quantity of times. After receiving the indication information, the primary network device does not reestablish an RRC link.

After the first unit receives the failure indication information, the terminal device sends indication information to the primary network device if the failure indication information indicates that the random access fails, where the indication information is used to indicate that the random access fails. After receiving the indication information, the primary network device does not reestablish an RRC link.

After the first unit receives the failure indication information, the terminal device sends indication information to the primary network device if the failure indication information indicates that the secondary-cell group change fails, where the indication information is used to indicate that the secondary-cell group change fails. After receiving the indication information, the primary network device does not reestablish an RRC link.

After the first unit receives the failure indication information, the terminal device sends indication information to the primary network device if the failure indication information indicates that the key fails, where the indication information is used to indicate that the key fails. After receiving the indication information, the primary network device does not reestablish an RRC link.

After the first unit receives the failure indication information, the terminal device sends indication information to the primary network device if the failure indication information indicates that the check fails, where the indication information is used to indicate that the check fails. After receiving the indication information, the primary network device does not reestablish an RRC link.

After the first unit receives the failure indication information, the terminal device sends indication information to the primary network device if the failure indication information indicates that the integrity protection fails, where the indication information is used to indicate that the integrity protection fails. After receiving the indication information, the primary network device does not reestablish an RRC link.

After the first unit receives the failure indication information, the terminal device sends the first indication information to the primary network device if the failure indication information indicates that the secondary network configuration received from the secondary network device fails, where the first indication information is used to indicate that the secondary network configuration received from the secondary network device fails (that is, the first RRC configuration described above fails). After receiving the first indication information, the primary network device does not reestablish an RRC link.

After the first unit receives the failure indication information, the terminal device sends a second message to the primary network device if the failure indication information indicates that the secondary network configuration received from the primary network device fails, where the second message is used to request RRC connection reestablishment. After receiving the second message, the primary network device reestablishes an RRC link. Optionally, the second message further includes third indication information, and the third indication information is used to indicate that the secondary network configuration received from the primary network device fails (that is, the second RRC configuration described above fails).

In the foregoing embodiments provided in this application, the failure processing methods provided in the embodiments of this application are described respectively from a perspective of each network element and from a perspective of interaction between network elements. It may be understood that, to implement the foregoing function, the network elements, such as the terminal device (for example, UE) and the network device (for example, a base station), include a corresponding hardware structure and/or software module for performing each function. A person skilled in the art should be easily aware that units and algorithm steps in the examples described with reference to the embodiments disclosed in this specification can be implemented in a form of hardware or in a form of a combination of hardware and computer software in this application. Whether a function is implemented by hardware or in a manner of driving hardware by computer software depends on particular applications and design constraints of the technical solutions. A person skilled in the art may use different methods to implement the described functions for each particular application, but it should not be considered that the implementation goes beyond the scope of this application.

In a scenario of handover between primary network devices, a first primary network device connected to a terminal device needs to be handed over to a second primary network device, a secondary network device connected to the terminal device remains unchanged, and a configuration of the secondary network device remains unchanged. Commonly, a first primary network device, a second primary network device, and a secondary network device have same standards, for example, they are all LTE network devices, or are all NR network devices. Therefore, a handover procedure is as follows: The first primary network device sends a configuration of the secondary network device to the second primary network device; and after receiving the configuration of the secondary network device, the second primary network device may read and understand the configuration, and therefore may generate a configuration based on the configuration and a capability of the terminal device, and enable that the final configuration does not exceed the capability of the terminal device.

In consideration of another application scenario, a first primary network device and a second primary network device have same standards, and the standards are different from a standard of a secondary network device. In this case, according to the foregoing handover procedure, because the second primary network device cannot understand a configuration of the secondary network device, the first primary network device cannot be handed over to the second primary network device according to the foregoing handover method.

Figure 4:
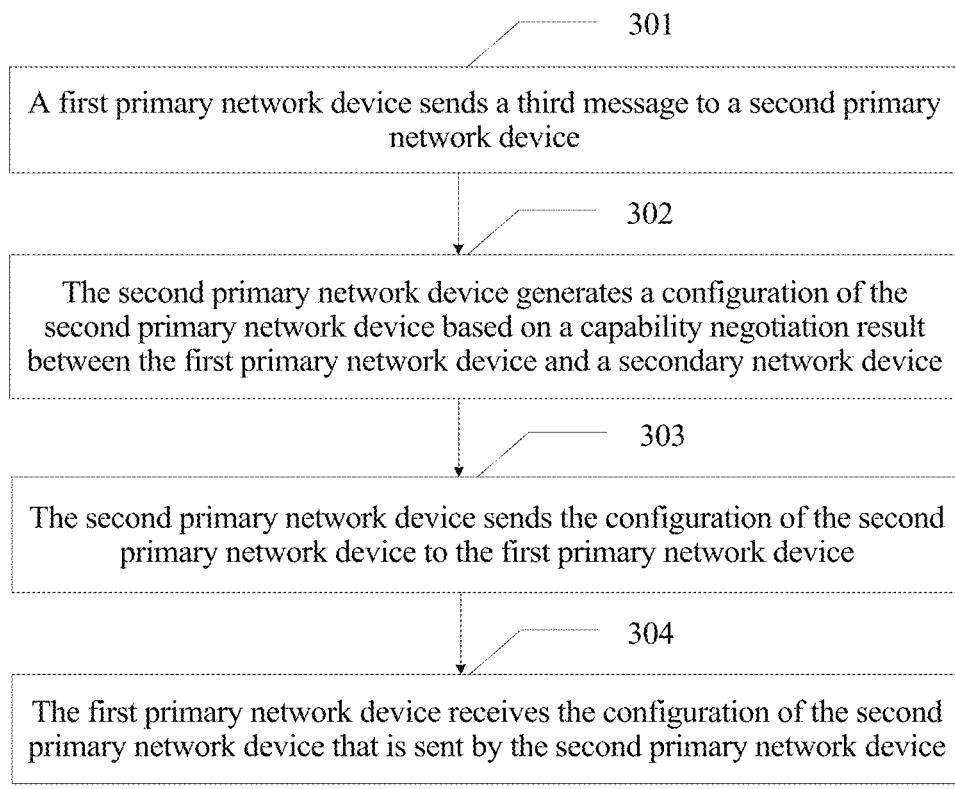
FIG. 4 is a flowchart of a handover method according to this application.

Therefore, this application further provides a handover method. As shown in FIG. 4, the method includes the following steps.

Step 301: A first primary network device sends a third message to a second primary network device.

The third message is used to request handover. For example, the third message is a handover request message, and the third message includes a capability coordination result between the first primary network device and a secondary network device.

Optionally, the capability coordination result includes a size of a layer 2 buffer that can be used by the first primary network device and/or a band combination that can be used by the first primary network device.

The layer 2 buffer is a layer 2 buffer of a terminal device, and the band combination is a band combination of the terminal device.

Step 302: The second primary network device generates a configuration of the second primary network device based on the capability negotiation result between the first primary network device and the secondary network device.

In other words, the configuration of the second primary network device is associated with the capability coordination result.

Optionally, the configuration is an RRC configuration.

Step 303: The second primary network device sends the configuration of the second primary network device to the first primary network device.

Step 304: The first primary network device receives the configuration of the second primary network device that is sent by the second primary network device.

By using step 301 to step 304, the first primary network device directly sends the capability coordination result between the first primary network device and the secondary network device to the second primary network device, so that the second primary network device generates the configuration based on the capability coordination result without obtaining and understanding a configuration of the secondary network device, and it can be enabled that the second primary network device can successfully generate the configuration in a handover process.

Optionally, the first primary network device may further receive a configuration of the secondary network device. Further, the first primary network device sends the configuration of the second primary network device and the configuration of the secondary network device to the terminal device. That the first primary network device receives a configuration of the secondary network device includes: the first primary network device receives the configuration of the secondary network device from the second primary network device, or the first primary network device receives the configuration of the secondary network device from the secondary network device.

To be specific, by using the foregoing steps, the second primary network device sends the configuration of the second primary network device to the first primary network device. Optionally, the second primary network device further sends the configuration of the secondary network device to the first primary network device (or the secondary network device sends the configuration of the secondary network device to the first primary network device). After receiving the configuration of the second primary network device, optionally, the first primary network device further receives the configuration of the secondary network device. The first primary network device sends the configuration of the second primary network device to the terminal device, and optionally, further sends the configuration of the secondary network device to the terminal device.

Optionally, if the terminal device receives the configuration of the secondary network device that is sent by the first primary network device, and the configuration of the secondary network device fails, the terminal device sends a fourth message to the first primary network device, where the fourth message is used to indicate RRC connection reestablishment.

For a detailed process of a failure processing method used when the terminal device receives the configuration of the secondary network device that is sent by the first primary network device and the configuration of the secondary network device fails, refer to the foregoing description and the description shown in FIG. 3(a). Details are not described herein again.

The following provides description by using band combination coordination as an example. For capability coordination of band combination, an optional solution is to maintain a band combination list. For example, as shown in Table 1, the first column is an index, the second column is a band combination that can be used by the first primary network device, and the third column is a band combination that can be used by the secondary network device when the first primary network device uses the band combination in the second column. Such a combination exists because a same radio frequency chain of a terminal device may be used in different bands, and the same radio frequency chain cannot be simultaneously used by the first primary network device and the secondary network device.

A network side can obtain information in Table 1 from a capability of the terminal device. Specifically, the first primary network device only needs to know a band combination that is of the first primary network device and that corresponds to an index, and the secondary network device only needs to know a band combination that is of the secondary network device and that corresponds to an index. In a capability coordination process, the first primary network device selects a band combination, and sends a corresponding index to the secondary network device. Therefore, the secondary network device may know a band combination that can be used by the secondary network device, thereby ensuring that a final configuration does not exceed the capability of the terminal device. For example, if a band combination selected by the first primary network device is 1, 3, and 5, the first primary network device sends an index 4 to the secondary network device, and therefore the secondary network device learns that a band combination that can be used by the secondary network device is 2, 3, and 4.

TABLE 1

| Index | Band combination of the first primary network device | Band combination of the secondary network device |
|---|---|---|
| 1 | 1, 2, 3, 4 | 2, 3, 5 |
| 2 | 2, 3, 4 | 2, 3, 4, 5 |
| 3 | 4, 5 | 1, 2, 3 |
| 4 | 1, 3, 5 | 2, 3, 4 |

After determining the band combination that can be used by the first primary network device, for example, the band combination that can be used is 1, 3, and 5, the first primary network device sends, to the second primary network device, the band combination that can be used by the first primary network device.

Then, the layer 2 buffer is used as an example. Assuming that a size of the layer 2 buffer of the terminal device is 1 G, the first primary network device coordinates with the secondary network device, for example, to finally determine that the size of the layer 2 buffer that can be used by the first primary network device is 600 M, and a size of a layer 2 buffer that can be used by the secondary network device is 400 M.

After determining the size of the layer 2 buffer and the band combination that can be used by the first primary network device, the first primary network device sends, to the second primary network device, the size of the layer 2 buffer and the band combination that can be used by the first primary network device. The second primary network device then generates the configuration, for example, generates an RRC configuration, and sends the configuration to the first primary network device. The first primary network device then sends the configuration to the terminal device.

Optionally, the secondary network device generates the configuration based on the size of the layer 2 buffer and a band combination that can be used by the secondary network device, and sends the configuration to the second primary network device. The second primary network device sends the configuration of the secondary network device and the configuration of the second primary network device together to the first primary network device, and the first primary network device sends the configurations to the terminal device.

Figure 5:
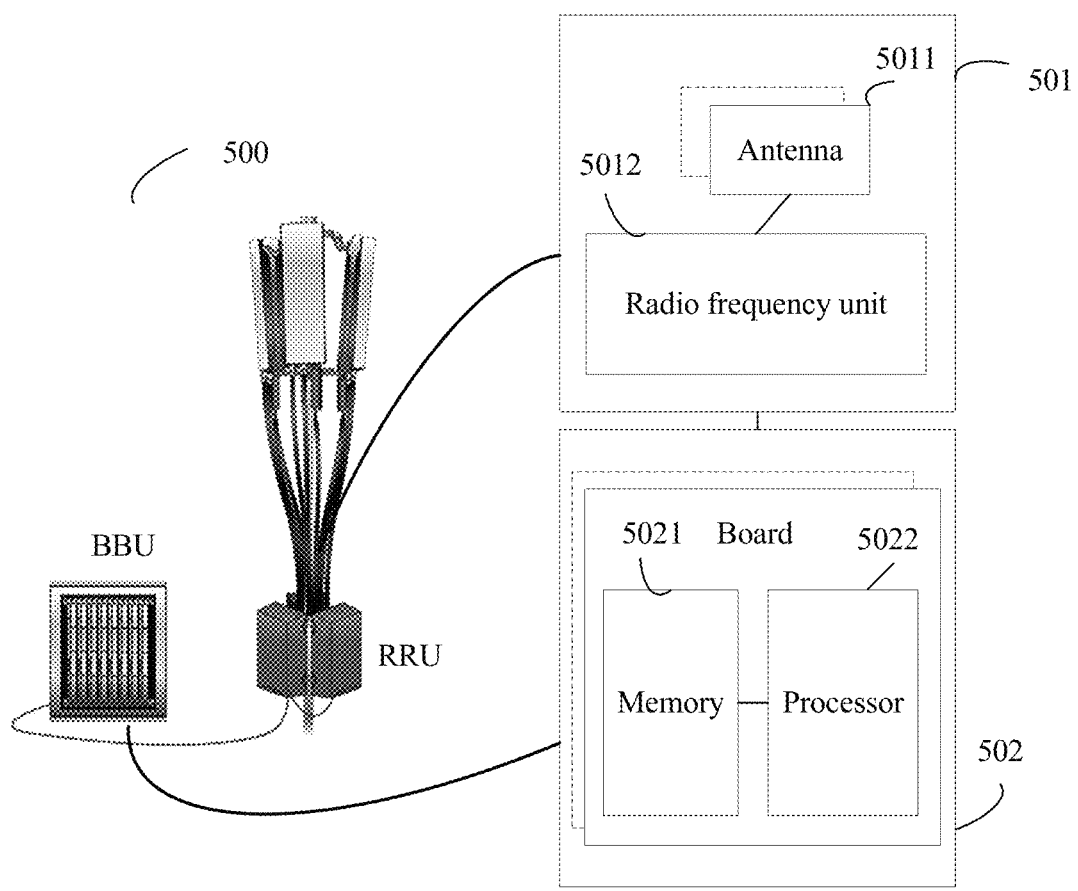
FIG. 5 is a schematic structural diagram of a network device according to this application.

Based on a same concept, an embodiment of this application further provides a network device 500. As shown in FIG. 5, the network device 500 may be configured to perform the method performed by the primary network device in the foregoing failure processing methods and the method performed by the first primary network device in the foregoing handover method. The network device 500 includes one or more remote radio units (RRU) 501 and one or more baseband units (BBU) 502. The RRU 501 may be referred to as a transceiver unit, a transceiver, a transceiver circuit, a transceiver, or the like; and may include at least one antenna 5011 and a radio frequency unit 5012. The RRU 501 is mainly configured to receive/send a radio frequency signal and convert a radio frequency signal and a baseband signal. The BBU 502 is mainly configured to perform baseband processing, control the network device, and the like. The RRU 501 and the BBU 502 may be physically disposed together; or the RRU 501 and the BBU 502 may be physically separated, or in other words, the RRU 501 and the BBU 502 are devices in a distributed network The BBU 502 is a control center of the network device, or may be referred to as a processing unit, and is mainly configured to complete baseband processing functions such as channel coding, multiplexing, modulation, and spectrum spreading. For example, the BBU (processing unit) may be configured to control the network device to perform the method performed by the primary network device in any one of the foregoing failure processing methods and the method performed by the first primary network device in the foregoing handover method.

In an example, the BBU 502 may include one or more boards, and a plurality of boards may jointly support a radio access network (such as an LTE network) of a single access standard, or may support radio access networks of different access standards. The BBU 502 further includes a memory 5021 and a processor 5022. The memory 5021 is configured to store a necessary instruction and necessary data. The processor 5022 is configured to control the network device to perform a necessary action, for example, is configured to control the network device to perform the method performed by the network device in any one of the foregoing embodiments. The memory 5021 and the processor 5022 may serve one or more boards. In other words, a memory and a processor may be separately disposed on each board. Alternatively, a plurality of boards may use a same memory and processor. In addition, a necessary circuit is further disposed on each board.

On an uplink, an uplink signal (including data and the like) sent by a terminal device is received by using the antenna 5011. On a downlink, a downlink signal (including data and/or control information) is sent to the terminal device by using the antenna 5011. In the processor 5022, service data and a signaling message are processed, and these units perform processing according to a radio access technology (such as access technologies in LTE, NR, and other evolved systems) used in a radio access network. The processor 5022 is further configured to control and manage an action of the network device, and is configured to perform processing performed by the network device in the foregoing embodiment. The processor 5022 is further configured to support the network device in performing processing procedures described in FIG. 3(a) and FIG. 3(b) and performed by the primary network device and the method described in FIG. 4 and performed by the first primary network device.

It may be understood that FIG. 5 shows only a simplified design of the network device. In actual application, the network device may include any quantity of antennas, memories, processors, radio frequency units, RRUs, BBUs, and the like, and all network devices that can implement this application fall within the protection scope of this application.

Specifically, in this application, for example, the RRU 501 is referred to as a transceiver. In this case, the transceiver and the processor in the network device 500 may be specifically configured to:

The transceiver is configured to receive first indication information from the terminal device, where the first indication information is used to indicate that a first RRC configuration of a secondary network device fails, and the first RRC configuration is received by the terminal device from the secondary network device.

The transceiver is further configured to send a first request message to the secondary network device, where the first request message is used to request the secondary network device to update an RRC configuration or request to release the secondary network device.

Optionally, the first request message includes the first indication information.

The transceiver and the processor in the network device 500 may be further specifically configured to.

If a second RRC configuration of a secondary network device fails, the transceiver is configured to receive a second message from the terminal device, where the second message is used to indicate RRC connection reestablishment, and the second RRC configuration is received by the terminal device from the primary network device.

The transceiver is further configured to initiate the RRC connection reestablishment to the terminal device.

Optionally, the second message includes third indication information, and the third indication information is used to indicate that the second RRC configuration fails.

The transceiver and the processor in the network device 500 may be further specifically configured to.

The transceiver is configured to send a third message to a second primary network device, where the third message is used to request handover, and the third message includes a capability coordination result between the first primary network device and a secondary network device.

The transceiver is further configured to receive a configuration of the second primary network device that is sent by the second primary network device, where the configuration of the second primary network device is associated with the capability coordination result.

Optionally, the capability coordination result includes a size of a layer 2 buffer that can be used by the first primary network device and/or a band combination that can be used by the first primary network device.

Optionally, the transceiver is further configured to receive a configuration of the secondary network device.

The transceiver is further configured to send the configuration of the second primary network device and the configuration of the secondary network device to the terminal device.

Optionally, the transceiver is further configured to receive the configuration of the secondary network device from the second primary network device.

Optionally, if the configuration of the secondary network device fails, the transceiver is further configured to receive a fourth message from the terminal device, where the fourth message is used to indicate RRC connection reestablishment.

Figure 6A:
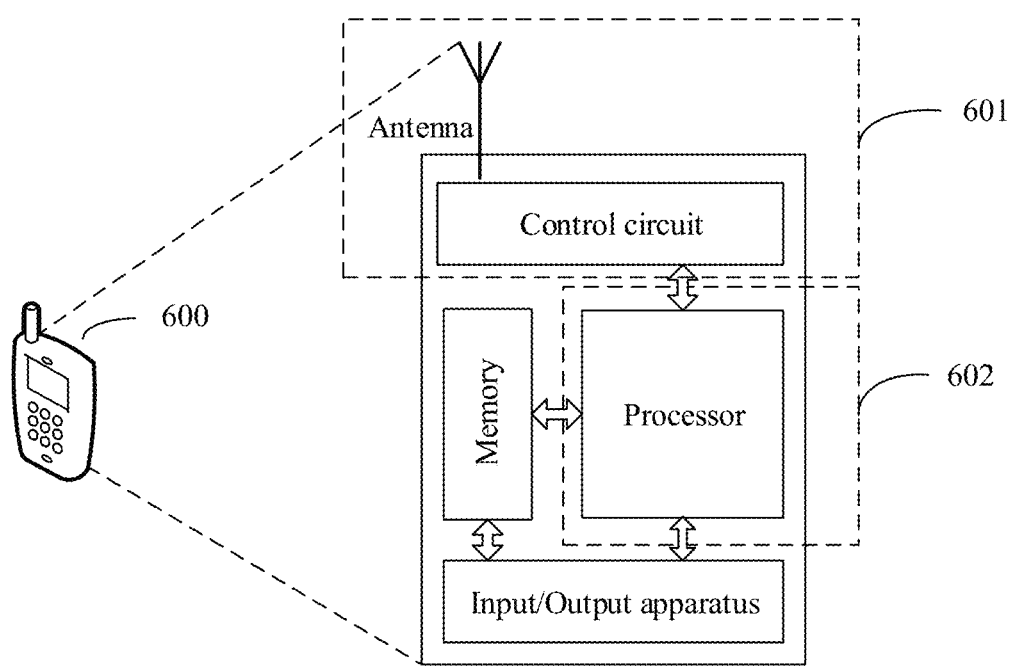
FIG. 6(a) is a schematic structural diagram of a terminal device according to this application.
Figure 6B:
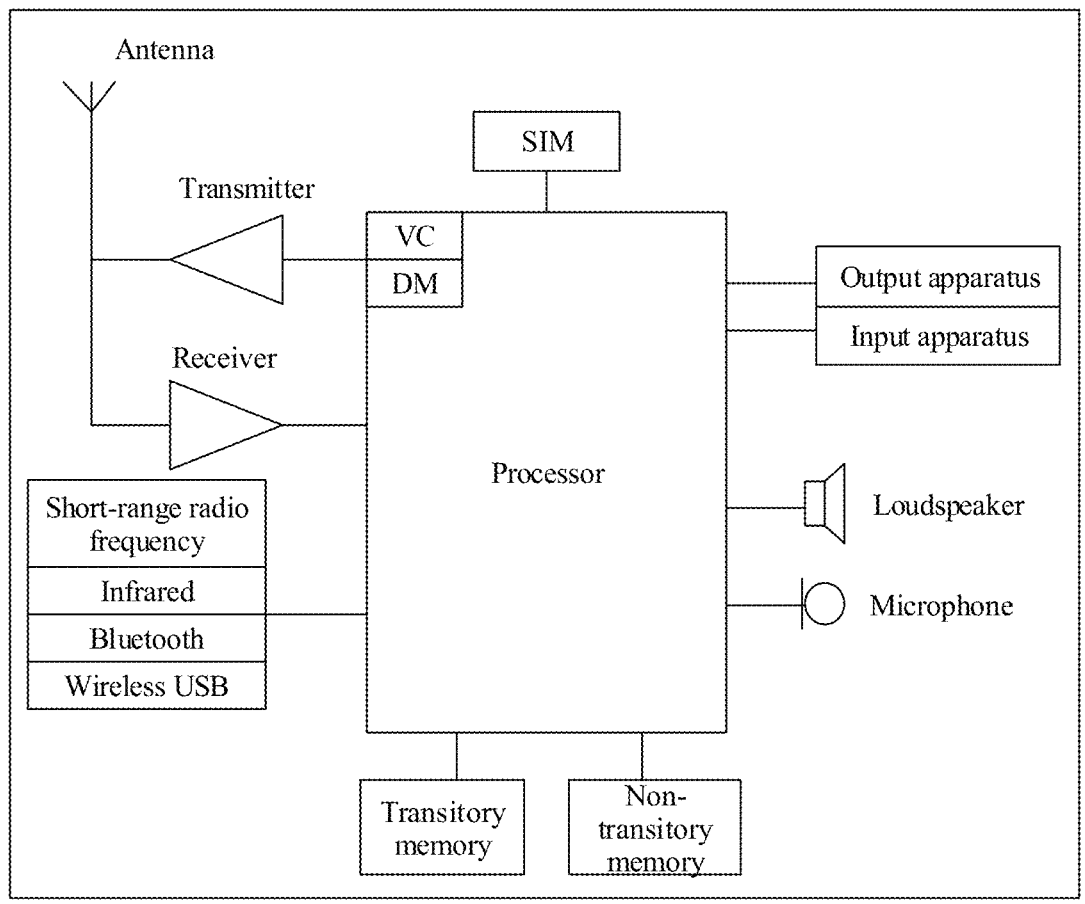
FIG. 6(b) is a schematic structural diagram of a terminal device according to this application.

Based on a same concept, an embodiment of this application further provides a terminal device 600. For ease of description, FIG. 6(*a*) shows only main components of the terminal device. As shown in FIG. 6(*a*), the terminal device 600 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device 600 in performing the method performed by the terminal device in any one of the foregoing embodiments. The memory is mainly configured to store the software program and the data. The control circuit is mainly configured to convert a baseband signal and a radio frequency signal and process a radio frequency signal. The control circuit, together with the antenna, may also be referred to as a transceiver that is mainly configured to receive/send a radio frequency signal in an electromagnetic wave form. The input/output apparatus, such as a touchscreen, a display screen, or a keyboard, is mainly configured to: receive data entered by a user and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. The radio frequency circuit performs radio frequency processing on the baseband signal, and then sends a radio frequency signal by using the antenna in an electromagnetic wave form. When data is sent to the terminal device 600, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 6(*a*) shows only one memory and one processor. Actually, the terminal device may include a plurality of processors and a plurality of memories. The memory may also be referred to as a storage medium, a storage device, or the like. This is not limited in this application.

In an optional implementation, the processor may include a baseband processor and a central processing unit. The baseband processor is mainly configured to process a communications protocol and communication data, and the central processing unit is mainly configured to: control the entire terminal device 600, execute a software program, and process data of the software program. Functions of the baseband processor and the central processing unit are integrated into the processor in FIG. 6(*a*). A person skilled in the art may understand that the baseband processor and the central processing unit each may be an independent processor, and they are interconnected by using a technology such as a bus. A person skilled in the art may understand that the terminal device may include a plurality of baseband processors to adapt to different network standards, the terminal device 600 may include a plurality of central processing units to enhance a processing capability of the terminal device 600, and all components of the terminal device 600 may be connected through various buses. The baseband processor may also be expressed as a baseband processing circuit or a baseband processing chip. The central processing unit may also be expressed as a central processing circuit or a central processing chip. A function of processing a communications protocol and communication data may be built into the processor, or may be stored in a storage unit in a form of a software program. The processor executes the software program to implement a baseband processing function.

For example, in this application, the antenna that has receiving and sending functions and the control circuit may be considered as a transceiver unit 601 of the terminal device 600, and the processor having a processing function may be considered as a processing unit 602 of the terminal device 600. As shown in FIG. 6(*a*), the terminal device 600 includes the transceiver unit 601 and the processing unit 602. The transceiver unit may also be referred to as a transceiver, a transceiver, a transceiver apparatus, or the like. Optionally, a component that is in the transceiver unit 601 and that is configured to implement a receiving function may be considered as a receiving unit, and a component that is in the transceiver unit 601 and that is configured to implement a sending function may be considered as a sending unit, in other words, the transceiver unit 601 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

On a downlink, a downlink signal (including data and/or control information) sent by a network device is received by using the antenna. On an uplink, an uplink signal (including data and/or control information) is sent to the network device by using the antenna. In the processor, service data and a signaling message are processed, and these units perform processing according to a radio access technology (such as access technologies in LTE, NR, and other evolved systems) used in a radio access network. The processor is further configured to control and manage an action of the terminal device, and is configured to perform processing performed by the terminal device in the foregoing embodiment. The processor is further configured to support the terminal device in performing processing procedures described in FIG. 3(*a*), FIG. 3(*b*), and FIG. 4 and performed by the terminal device.

It may be understood that FIG. 6(*a*) shows only a simplified design of the terminal device. In actual application, the terminal device may include any quantity of antennas, memories, processors, and the like, and all terminal devices that can implement this application fall within the protection scope of this application.

Specifically, in this application, for example, the transceiver unit is referred to as a transceiver, and the processing unit is referred to as a processor. In this case, the transceiver and the processor in the terminal device 600 may be specifically configured to:

The transceiver is configured to receive a first RRC configuration of a secondary network device from the secondary network device.

The transceiver is further configured to send first indication information to a primary network device, where the first indication information is used to indicate that the first RRC configuration fails.

Optionally, the transceiver is further configured to send a first message to the primary network device, where the first message includes the first indication information.

Optionally, if a first unit of the terminal device receives second indication information sent by a second unit of the terminal device, the transceiver is further configured to send the first indication information to the primary network device, where the second indication information is used to indicate that the first RRC configuration received from the secondary network device fails, the first unit is configured to control an RRC connection between the primary network device and the terminal device, and the second unit is configured to control an RRC connection between the secondary network device and the terminal device.

Optionally, the first unit is a first RRC entity, and the second unit is a second RRC entity.

Optionally, the transceiver is further configured to receive a new RRC configuration from the secondary network device.

The transceiver and the processor in the terminal device 600 may be further specifically configured to.

The transceiver is configured to receive a second RRC configuration of a secondary network device from a primary network device.

If the second RRC configuration fails, the transceiver is further configured to send a second message to the primary network device, where the second message is used to request RRC connection reestablishment.

Optionally, the second message includes third indication information, and the third indication information is used to indicate that the second RRC configuration fails.

Optionally, if a first unit of the terminal device receives fourth indication information sent by a second unit of the terminal device, the transceiver is further configured to send the second message to the primary network device, where the fourth indication information is used to indicate that the second RRC configuration received from the primary network device fails, the first unit is configured to control an RRC connection between the primary network device and the terminal device, and the second unit is configured to control an RRC connection between the secondary network device and the terminal device.

Optionally, the first unit is a first RRC entity, and the second unit is a second RRC entity.

Optionally, the transceiver is further configured to receive a third RRC configuration of the primary network device from the primary network device.

If the third RRC configuration fails, the processor performs at least one of the following actions: stopping executing the second RRC configuration, releasing the second RRC configuration, and suspending a radio bearer of the secondary network device.

Optionally, if the second unit receives fifth indication information sent by the first unit, the processor performs at least one of the foregoing actions, where the fifth indication information is used to indicate that the third RRC configuration fails.

FIG. 6(*b*) is a schematic diagram of another terminal device according to this application, and the terminal device may be configured to perform an operation performed by the terminal device in any one of the foregoing embodiments. A processor may include a circuit used for audio/video and logical functions of the terminal device. For example, the processor may include a digital signal processor device, a microprocessor device, an analog-to-digital converter, a digital-to-analog converter, and the like. Control and signal processing functions of a mobile device may be allocated between these devices based on respective capabilities of the devices. The processor may further include an internal voice coder (VC), an internal data modem (DM), and the like. In addition, the processor may include functions for operating one or more software programs, and the software programs may be stored in a memory. Usually, the processor and the stored software instruction may be configured to enable the terminal device to perform an action. For example, the processor can operate a connection program.

The terminal device may further include a user interface. The user interface may include, for example, a headset or loudspeaker, a microphone, an output apparatus (for example, a display), and an input apparatus. The user interface may be operationally coupled to the processor. In this case, the processor may include a user interface circuit, configured to control at least some functions of one or more elements (for example, the loudspeaker, the microphone, and the display) of the user interface. The processor and/or the user interface circuit included in the processor may be configured to control one or more functions of the one or more elements of the user interface by using a computer program instruction (for example, software and/or firmware) stored in a memory accessible to the processor. Although not shown, the terminal device may include a battery configured to supply power to various circuits related to the mobile device. The circuit is, for example, a circuit that provides mechanical vibration as detectable output. The input apparatus may include a device that allows the apparatus to receive data, such as a keypad, a touch display, a joystick, and/or at least one other input device.

The terminal device may further include one or more connection circuit modules configured to share and/or obtain data. For example, the terminal device may include a short-range radio frequency (RF) transceiver and/or detector, to share data with an electronic device and/or obtain data from an electronic device based on an RF technology. The terminal device may include other short-range transceivers, such as an infrared (IR) transceiver, a Bluetooth transceiver, and a wireless universal serial bus (USB) transceiver. The Bluetooth transceiver can perform an operation based on a low-power or ultra-low-power Bluetooth technology. In this case, the terminal device, more specifically, the short-range transceiver, can send data to and/or receive data from an electronic device near the apparatus (for example, within 10 meters). Although not shown, the terminal device can send data to and/or receive data from the electronic device based on various wireless networking technologies, and these technologies include: Wi-Fi, Wi-Fi low power consumption, and WLAN technologies such as an IEEE 802.11 technology, an IEEE 802.15 technology, and an IEEE 802.16 technology.

The terminal device may include a memory that can store an information element related to a mobile user, such as a subscriber identity module (SIM). In addition to the SIM, the apparatus may further include another removable and/or fixed memory. The terminal device may include a transitory memory and/or a non-transitory memory. For example, the transitory memory may include a random access memory RAM, and the RAM includes a dynamic RAM and/or a static RAM, an on-chip and/or off-chip buffer, and the like. The non-transitory memory may be embedded and/or removable. The non-transitory memory may include, for example, a read-only memory, a flash memory, a magnetic storage device such as a hard disk, a floppy disk drive, or a magnetic tape, an optical disc drive and/or a medium, a non-transitory random access memory (NVRAM), and the like. Similar to the transitory memory, the non-transitory memory may include a buffer area used for temporary storage of data. At least a part of the transitory memory and/or the non-transitory memory may be embedded into the processor. The memory may store one or more software programs, instructions, information blocks, data, and the like. The memory may be used by the terminal device to perform a function of a mobile terminal. For example, the memory may include an identifier that can uniquely identify the terminal device, such as an international mobile equipment identity (IMEI) code.

Figure 7:
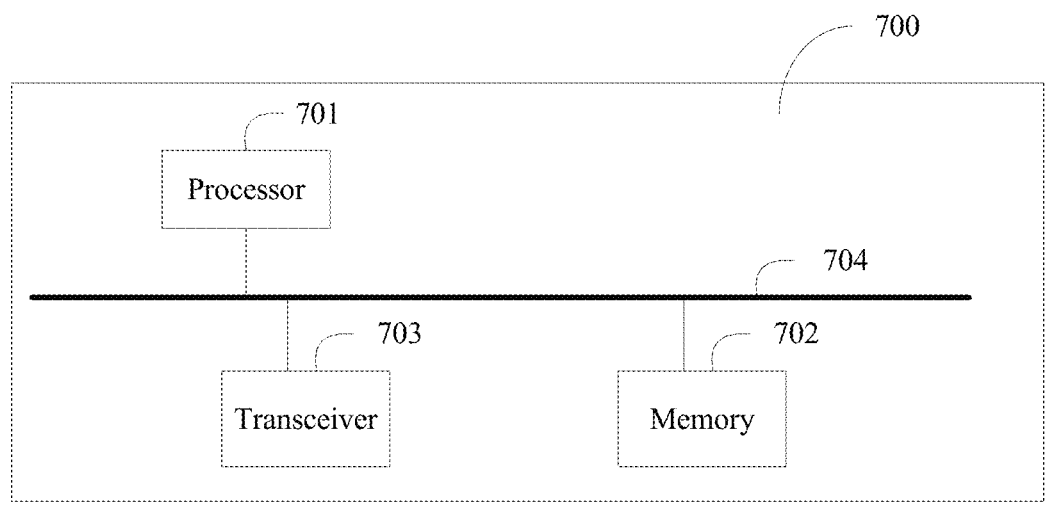
FIG. 7 is a schematic structural diagram of an apparatus according to this application.

Based on a same concept, an embodiment of this application further provides an apparatus 700. The apparatus 700 may be a network device, or may be a terminal device. As shown in FIG. 7, the apparatus 700 includes at least a processor 701 and a memory 702, may further include a transceiver 703, and may further include a bus 704.

The processor 701, the memory 702, and the transceiver 703 are all connected through the bus 704.

The memory 702 is configured to store a computer execution instruction.

The processor 701 is configured to execute the computer execution instruction stored in the memory 702.

When the apparatus 700 is a network device, the processor 701 executes the computer execution instruction stored in the memory 702, so that the apparatus 700 performs a step performed by the primary network device in any one of the foregoing failure processing methods, or a functional unit corresponding to the step is deployed for the primary network device; or the apparatus 700 performs a step performed by the first primary network device in the foregoing handover method, or a functional unit corresponding to the step is deployed for the first primary network device.

When the apparatus 700 is a terminal device, the processor 701 executes the computer execution instruction stored in the memory 702, so that the apparatus 700 performs a step performed by the terminal device in any one of the foregoing failure processing methods or the handover method provided in the embodiments of this application, or a functional unit corresponding to the step is deployed for the terminal device.

The processor 701 may include processors 701 of different types, or may include processors 701 of a same type. The processor 701 may be any one of the following devices having a computing and processing capability, such as a central processing unit (CPU), an ARM processor (English full name of ARM: Advanced RISC Machines, English full name of RISC: Reduced Instruction Set Computing), a field programmable gate array (FPGA), and a dedicated processor. In an optional implementation, the processor 701 may be integrated as a many-core processor.

The memory 702 may be any one or any combination of the following storage media, such as a random access memory (RAM), a read-only memory (ROM), a non-transitory memory (NVM), a solid state drive (SSD), a mechanical hard disk, a magnetic disk, and a disk array.

The transceiver 703 is used by the apparatus 700 to exchange data with another device. For example, if the apparatus 700 is a network device, the network device may perform the method performed by the network device in any one of the foregoing embodiments. The network device exchanges data with a terminal device by using the transceiver 703. If the apparatus 700 is a terminal device, the terminal may perform the method performed by the terminal device in any one of the foregoing embodiments. The terminal device exchanges data with a network device by using the transceiver 703. The transceiver 703 may be any one or any combination of the following devices having a network access function, such as a network interface (such as an Ethernet interface) and a wireless network interface card.

The bus 704 may include an address bus, a data bus, a control bus, and the like. For ease of representation, the bus is represented by using a thick line in FIG. 7. The bus 704 may be any one or any combination of the following components for wired data transmission: an industry standard architecture (ISA) bus, a peripheral component interconnect (PCI) bus, an extended industry standard architecture (EISA) bus, and the like.

An embodiment of this application provides a computer-readable storage medium, where the computer-readable storage medium stores a computer execution instruction. A processor of a terminal device executes the computer execution instruction, so that the terminal device performs a step performed by the terminal device in the foregoing failure processing methods and the handover method provided in this application, or a functional unit corresponding to the step is deployed for the terminal device.

An embodiment of this application provides a computer-readable storage medium, where the computer-readable storage medium stores a computer execution instruction. A processor of a network device executes the computer execution instruction, so that the network device performs a step performed by the primary network device in the foregoing failure processing methods provided in this application, or a functional unit corresponding to the step is deployed for the network device; or the network device performs a step performed by the first primary network device in the foregoing handover method provided in this application, or a functional unit corresponding to the step is deployed for the network device.

An embodiment of this application provides a computer program product. The computer program product includes a computer execution instruction, and the computer execution instruction is stored in a computer-readable storage medium. A processor of a terminal device may read the computer execution instruction from the computer-readable storage medium. The processor executes the computer execution instruction, so that the terminal device performs a step performed by the terminal device in the foregoing methods provided in the embodiments of this application, or a functional unit corresponding to the step is deployed for the terminal device.

An embodiment of this application provides a computer program product. The computer program product includes a computer execution instruction, and the computer execution instruction is stored in a computer-readable storage medium. A processor of a network device may read the computer execution instruction from the computer-readable storage medium. The processor executes the computer execution instruction, so that the network device performs a step performed by the primary network device in the foregoing failure processing methods provided in the embodiments of this application, or a functional unit corresponding to the step is deployed for the network device; or the network device performs a step performed by the first primary network device in the foregoing handover method provided in the embodiments of this application, or a functional unit corresponding to the step is deployed for the network device.

This application further provides a chip system. The chip system includes a processor, configured to support a terminal device in implementing functions in the foregoing aspects, for example, generating, receiving, or processing data and/or information in the foregoing methods. In a possible design, the chip system further includes a memory. The memory may be configured to store a program instruction and data that are necessary for the terminal device. The chip system may include a chip, or may include a chip and another discrete device.

This application further provides a chip system. The chip system includes a processor, configured to support a network device in implementing functions in the foregoing aspects, for example, generating, receiving, or processing data and/or information in the foregoing methods. In a possible design, the chip system further includes a memory. The memory is configured to store a program instruction and data that are necessary for the data receiving device. The chip system may include a chip, or may include a chip and another discrete device.

Figure 8:
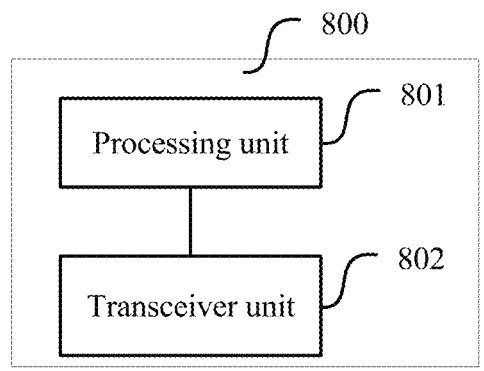
FIG. 8 is a schematic structural diagram of a terminal device according to this application.

Based on a same concept, this application further provides a terminal device 800. As shown in FIG. 8, the terminal device 800 includes a processing unit 801 and a transceiver unit 802, and may be configured to perform the method performed by the terminal device in any one of the foregoing embodiments. Optionally, the processing unit 801 and the transceiver unit 802 are configured to.

The transceiver unit 802 is configured to receive a first RRC configuration of a secondary network device from the secondary network device.

The transceiver unit 802 is further configured to send first indication information to a primary network device, where the first indication information is used to indicate that the first RRC configuration fails.

Optionally, the transceiver unit 802 is further configured to send a first message to the primary network device, where the first message includes the first indication information.

Optionally, if a first unit of the terminal device receives second indication information sent by a second unit of the terminal device, the transceiver unit 802 is further configured to send the first indication information to the primary network device, where the second indication information is used to indicate that the first RRC configuration received from the secondary network device fails, the first unit is configured to control an RRC connection between the primary network device and the terminal device, and the second unit is configured to control an RRC connection between the secondary network device and the terminal device.

Optionally, the first unit is a first RRC entity, and the second unit is a second RRC entity.

Optionally, the transceiver unit 802 is further configured to receive a new RRC configuration from the secondary network device.

The processing unit 801 and the transceiver unit 802 are further configured to:

The transceiver unit 802 is configured to receive a second RRC configuration of a secondary network device from a primary network device.

If the second RRC configuration fails, the transceiver unit 802 is further configured to send a second message to the primary network device, where the second message is used to request RRC connection reestablishment.

Optionally, the second message includes third indication information, and the third indication information is used to indicate that the second RRC configuration fails.

Optionally, if a first unit of the terminal device receives fourth indication information sent by a second unit of the terminal device, the transceiver unit 802 is further configured to send the second message to the primary network device, where the fourth indication information is used to indicate that the second RRC configuration received from the primary network device fails, the first unit is configured to control an RRC connection between the primary network device and the terminal device, and the second unit is configured to control an RRC connection between the secondary network device and the terminal device.

Optionally, the first unit is a first RRC entity, and the second unit is a second RRC entity.

Optionally, the transceiver unit 802 is further configured to receive a third RRC configuration of the primary network device from the primary network device.

If the third RRC configuration fails, the processing unit 801 performs at least one of the following actions: stopping executing the second RRC configuration, releasing the second RRC configuration, and suspending a radio bearer of the secondary network device.

Optionally, if the second unit receives fifth indication information sent by the first unit, the processing unit 801 performs at least one of the following actions, where the fifth indication information is used to indicate that the third RRC configuration fails.

Figure 9:
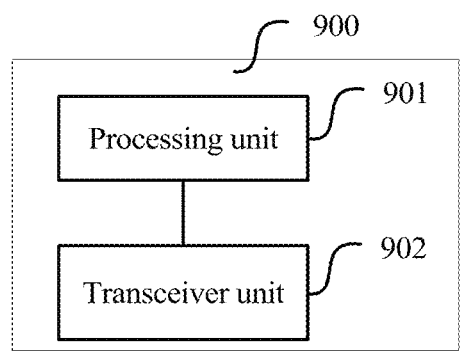
FIG. 9 is a schematic structural diagram of a network device according to this application.

Based on a same concept, this application further provides a network device 900. As shown in FIG. 9, the network device 900 includes a processing unit 901 and a transceiver unit 902, and may be configured to perform the method performed by the primary network device in the foregoing failure processing methods, or may be configured to perform the method performed by the first primary network device in the foregoing handover method. Optionally, the processing unit 901 and the transceiver unit 902 are configured to:

The transceiver unit 902 is configured to receive first indication information from a terminal device, where the first indication information is used to indicate that a first RRC configuration of a secondary network device fails, and the first RRC configuration is received by the terminal device from the secondary network device.

The transceiver unit 902 is further configured to send a first request message to the secondary network device, where the first request message is used to request the secondary network device to update an RRC configuration or request to release the secondary network device.

Optionally, the first request message includes the first indication information.

Optionally, the processing unit 901 and the transceiver unit 902 are further configured to:

If a second RRC configuration of a secondary network device fails, the transceiver unit 902 is configured to receive a second message from a terminal device, where the second message is used to indicate RRC connection reestablishment, and the second RRC configuration is received by the terminal device from the primary network device.

The transceiver unit 902 is further configured to initiate the RRC connection reestablishment to the terminal device.

Optionally, the second message includes third indication information, and the third indication information is used to indicate that the second RRC configuration fails.

Optionally, the processing unit 901 and the transceiver unit 902 are further configured to.

The transceiver unit 902 is configured to send a third message to a second primary network device, where the third message is used to request handover, and the third message includes a capability coordination result between the first primary network device and the secondary network device.

The transceiver unit 902 is further configured to receive a configuration of the second primary network device that is sent by the second primary network device, where the configuration of the second primary network device is associated with the capability coordination result.

Optionally, the capability coordination result includes a size of a layer 2 buffer that can be used by the first primary network device and/or a band combination that can be used by the first primary network device.

Optionally, the transceiver unit 902 is further configured to receive a configuration of the secondary network device.

The transceiver unit 902 is further configured to send the configuration of the second primary network device and the configuration of the secondary network device to a terminal device.

Optionally, the transceiver unit 902 is further configured to receive the configuration of the secondary network device from the second primary network device.

Optionally, if the configuration of the secondary network device fails, the transceiver unit 902 is further configured to receive a fourth message from the terminal device, where the fourth message is used to indicate RRC connection reestablishment.

Figure 10:
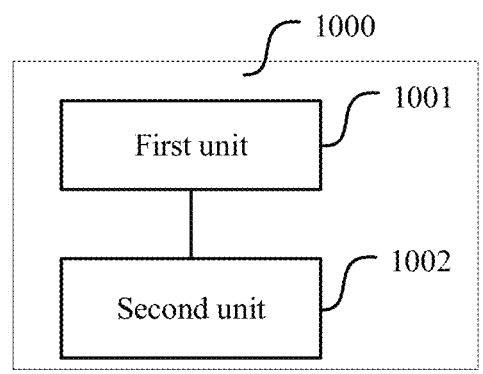
FIG. 10 is a schematic structural diagram of a communications device according to this application.

Based on a same concept, as shown in FIG. 10, this application further provides a communications device 1000. The communications device 1000 may be a terminal device, a baseband chip, or the like, and includes a first unit 1001 and a second unit 1002. For details, refer to FIG. 2(*a*) and FIG. 2(*b*). The first unit 1001 and the second unit 1002 may be configured to respectively perform functions performed by the first unit 1001 and the second unit 1002 in the foregoing failure processing methods. For details, refer to the foregoing description.

For example, the following describes some functions of the first unit 1001 and the second unit 1002. The first unit 1001 is configured to control an RRC connection between a primary network device and the terminal device, and the second unit 1002 is configured to control an RRC connection between a secondary network device and the terminal device.

Optionally, the second unit 1002 generates second indication information if the second unit 1002 determines that a first RRC configuration of the secondary network device that is received by the terminal device from the secondary network device fails, where the second indication information is used to indicate that the first RRC configuration fails. The second unit 1002 sends the second indication information to the first unit 1001.

Optionally, the second unit 1002 generates fourth indication information if the second unit 1002 determines that a second RRC configuration of the secondary network device that is received by the terminal device from the primary network device fails, where the fourth indication information is used to indicate that the second RRC configuration fails. The second unit 1002 sends the fourth indication information to the first unit 1001.

Optionally, the first unit 1001 generates fifth indication information if the first unit 1001 determines that a third RRC configuration of the secondary network device that is received by the terminal device from the primary network device fails, where the fifth indication information is used to indicate that the third RRC configuration fails. The first unit 1001 sends the fifth indication information to the second unit 1002.

Optionally, the second unit sends failure indication information to the first unit, where the failure indication information is used to indicate that a link between the terminal device and the secondary network device fails; and the first unit receives the failure indication information. Optionally, the failure indication information is specifically used to indicate any one of the following cases: a timer expires, a quantity of retransmission times exceeds a maximum quantity of times, random access fails, a secondary-cell group change fails, a key fails, a check fails, integrity protection fails, a secondary network configuration received from the secondary network device fails, and a secondary network configuration received from a primary network device fails.

When the failure indication information is used to indicate that the secondary network configuration received from the secondary network device fails, the failure indication information is the second indication information described above.

When the failure indication information is used to indicate that the secondary network configuration received from the primary network device fails, the failure indication information is the fourth indication information described above.

Optionally, the first unit 1001 is a first RRC entity, and the second unit 1002 is a second RRC entity.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person skilled in the art can further understand that, the various illustrative logical blocks and the steps (step) listed in this application may be implemented through electronic hardware, computer software, or a combination of the two. Whether the functions are implemented by using hardware or software depends on particular applications and a design requirement of an entire system. A person skilled in the art may use various methods to implement the described functions for each particular application, but it should not be considered that the implementation goes beyond the protection scope of this application.

Various illustrative logic units and circuits described in this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination of the foregoing. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors together with a digital signal processor core, or any other similar configuration.

Steps of the methods or algorithms described in this application may be directly embedded into hardware, a software unit executed by the processor, or a combination thereof. The software unit may be stored in a random access memory (RAM), a flash memory, a read-only memory (ROM), an erasable programmable read only memory (, EPROM), a register, a hard disk, a removable disk, a compact disc read-only memory (CD-ROM), or any other form of storage medium in the art. For example, the storage medium may be connected to the processor, so that the processor may read information from the storage medium and write information to the storage medium. Alternatively, the storage medium may be integrated into the processor. The processor and the storage medium may be disposed in an ASIC, and the ASIC may be disposed in a terminal device or a network device. Optionally, the processor and the storage medium may be disposed in different components of the terminal device or the network device.

In one or more example designs, the functions described in this application may be implemented by using hardware, software, firmware, or any combination thereof. If the functions are implemented by using software, the functions may be stored in a computer-readable medium or are transmitted to the computer-readable medium in a form of one or more instructions or code. The computer-readable medium includes a computer storage medium and a communications medium that enables a computer program to move from one place to another place. The storage medium may be an available medium that can be accessed by any general-purpose or special computer. For example, such a computer-readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction or a data structure or in a form that can be read by a general-purpose or special computer or by a general-purpose or special processor. In addition, any connection may be appropriately defined as a computer-readable medium. For example, if software is transmitted from a website, a server, or another remote resource by using a coaxial cable, an optical fiber cable, a twisted pair, a digital subscriber line (DSL) or in a wireless manner, such as infrared, radio, or microwave, the software is included in a defined computer-readable medium. The disc and the disk include a compressed disk, a laser disk, an optical disc, a digital versatile disc (DVD), a floppy disk, and a Blu-ray disc. The disk generally copies data by a magnetic means, and the disc generally copies data optically by a laser means. The foregoing combination may also be included in the computer-readable medium.

A person skilled in the art should be aware that in one or more of the foregoing examples, the functions described in this application may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application. The foregoing descriptions of this specification in this application may enable a person skilled in the art to use or implement the content of this application. It should be considered that any modification made based on the disclosed content is obvious in the art. The basic principles described in this application may be applied to other variants without departing from the essence and scope of this application. Therefore, the content disclosed in this application is not limited to the described embodiments and designs, but may be further extended to a maximum scope that is consistent with the principles of this application and new features disclosed in this application.

What is claimed is:

1. An apparatus comprising:
one or more processors; and
a memory having instructions stored thereon for execution by the one or more processors to cause the apparatus to perform operations comprising:
receiving, from a primary network device, a first radio resource control (RRC) configuration of a secondary network device;
sending, to the primary network device, a first message for requesting RRC connection reestablishment in response to the first RRC configuration fails;
receiving, from the secondary network device, a second RRC configuration of the secondary network device; and
sending, to the primary network device, a first indication indicating a configuration failure of the second RRC configuration in response to the second RRC configuration fails.

2. The apparatus according to claim 1, wherein sending the first indication to the primary network device comprises:
sending, to the primary network device, a second message that comprises the first indication.

3. The apparatus according to claim 1, wherein the first message comprises a second indication indicating a configuration failure of the first RRC configuration.

4. The apparatus according to claim 1, wherein sending the first message comprises:
sending the first message to the primary network device in response to receiving a third indication by a first RRC entity of the apparatus from a second RRC entity of the apparatus, wherein the third indication indicates a configuration failure of the first RRC configuration, the first RRC entity controls a RRC connection between the primary network device and the apparatus, and the second RRC entity controls a RRC connection between the secondary network device and the apparatus.

5. An apparatus comprising:
one or more processors; and
a memory having instructions stored thereon for execution by the one or more processors to cause the apparatus to perform operations comprising:
in response to a first radio resource control (RRC) configuration of a secondary network device being received from the apparatus;
receiving, from a terminal device, a first message for requesting RRC connection reestablishment; and
in response to a second RRC configuration of the secondary network device being received from the secondary network device:
receiving, from the terminal device, a first indication indicating a configuration failure of the second RRC configuration; and
sending, to the secondary network device, a request for updating the second RRC configuration or releasing the secondary network device.

6. The apparatus according to claim 5, wherein the first indication is comprised in the request.

7. The apparatus according to claim 5, wherein receiving the first indication from the terminal device comprises:
receiving, from the terminal device, wherein a second message that comprises the first indication.

8. The apparatus according to claim 5, wherein the first message comprises a second indication indicating a configuration failure of the first RRC configuration.

9. The apparatus according to claim 5, wherein the operations further comprising:
sending, to the terminal device, a third message for reestablishing a signaling radio bearer (SRB).

10. A method comprising:
in response to a first radio resource control (RRC) configuration of a secondary network device being received from a primary network device;
receiving, by a primary network device from a terminal device, a first message for requesting RRC connection reestablishment; and
in response to a second RRC configuration of the secondary network device being received from the secondary network device:
receiving, by the primary network device from the terminal device, a first indication indicating a configuration failure of the second RRC configuration; and
sending, by the primary network device to the secondary network device, a request for updating the second RRC configuration or releasing the secondary network device.

11. The method according to claim 10, wherein the first indication is comprised in the request.

12. The method according to claim 10, wherein receiving, by the primary network device from the terminal device, the first indication comprises:
receiving, by the primary network device from the terminal device, a second message that comprises the first indication.

13. The method according to claim 10, wherein the first message comprises a second indication indicating a configuration failure of the first RRC configuration.

14. The method according to claim 10, further comprising:
sending, by the primary network device to the terminal device, a third message for reestablishing a signaling radio bearer (SRB).

15. A method comprising:
receiving, by a terminal device and from a primary network device, a first radio resource control (RRC) configuration of a secondary network device;
sending, by the terminal device to the primary network device, a first message for requesting RRC connection reestablishment in response to the first RRC configuration fails;
receiving, by the terminal device from the secondary network device, a second RRC configuration of the secondary network device;
sending, by the terminal device to the primary network device, a first indication indicating a configuration failure of the second RRC configuration in response to the second RRC configuration fails;
receiving, by the primary network device, the first indication; and
sending, by the primary network device to the secondary network device, a request for updating the second RRC configuration or releasing the secondary network device.

16. The method according to claim 15, wherein the first indication is comprised in the request.

17. The method according to claim 15, wherein the first message comprises a second indication indicating a configuration failure of the first RRC configuration.

18. The method according to claim 15, wherein sending the first message comprises:

sending the first message to the primary network device in response to receiving a third indication by a first RRC entity of the terminal device from a second RRC entity of the terminal device, wherein the third indication indicates a configuration failure of the first RRC configuration, the first RRC entity controls a RRC connection between the primary network device and the terminal device, and the second RRC entity controls a RRC connection between the secondary network device and the terminal device.

* * * * *